(12) United States Patent
Snow et al.

(10) Patent No.: US 10,335,687 B2
(45) Date of Patent: Jul. 2, 2019

(54) SYSTEM AND METHOD FOR PROCESSING VIRTUAL OBJECTS IN A COMPUTING ENVIRONMENT

(71) Applicants: Mike Snow, Carnation, WA (US); Srikant Vemparala, Redmond, WA (US); Pradeep Kanneganti, Hyderabad (IN)

(72) Inventors: Mike Snow, Carnation, WA (US); Srikant Vemparala, Redmond, WA (US); Pradeep Kanneganti, Hyderabad (IN)

(73) Assignee: 9LOGIC TECHNOLOGIES, Redmond, WA (US)

( * ) Notice: Subject to any disclaimer, the term of this patent is extended or adjusted under 35 U.S.C. 154(b) by 389 days.

(21) Appl. No.: 15/373,496

(22) Filed: Dec. 9, 2016

(65) Prior Publication Data

US 2018/0161678 A1 Jun. 14, 2018

(51) Int. Cl.
| | |
|---|---|
| *A63F 13/69* | (2014.01) |
| *A63F 13/822* | (2014.01) |
| *A63F 13/61* | (2014.01) |
| *A63F 13/5378* | (2014.01) |
| *G06T 19/00* | (2011.01) |
| *A63F 13/5375* | (2014.01) |

(52) U.S. Cl.
CPC .......... *A63F 13/69* (2014.09); *A63F 13/5375* (2014.09); *A63F 13/5378* (2014.09); *A63F 13/61* (2014.09); *A63F 13/822* (2014.09); *G06T 19/003* (2013.01); *G06T 2200/24* (2013.01)

(58) Field of Classification Search
CPC .......................... G06T 2200/24; G06T 19/003
See application file for complete search history.

(56) References Cited

U.S. PATENT DOCUMENTS

2013/0288798 A1\* 10/2013 Ruckart .................. A63F 13/10
463/40

\* cited by examiner

*Primary Examiner* — Robert T Clarke, Jr.

(57) ABSTRACT

Exemplary embodiments of the present disclosure are directed towards a system and method for processing virtual objects in a computing environment. The method includes hiding a plurality of virtual objects at a plurality of user navigating virtual locations. The hided plurality of virtual objects is dynamically generated in response to the plurality of user navigating virtual locations associated with a plurality corresponding real-time locations. The method includes collecting the dynamically generated plurality of virtual objects by a user and dynamically generates the plurality of virtual objects at the plurality of user navigating virtual locations. The user enabled to use a plurality of virtual game objects for collecting the plurality of dynamically generated virtual objects within the plurality of user navigating virtual locations. The method further includes offering a plurality of virtual rewards to the user based on the collection of plurality of virtual objects within the plurality of user navigating virtual locations and the offer plurality of virtual rewards configured to be processed for participating in an uber hunt. The method further includes solving a plurality of interactive queries by using the plurality of virtual rewards for participating in the uber hunt. An uber virtual object in the uber hunt configured to provide a higher level reward to the user once the uber virtual object collected.

1 Claim, 29 Drawing Sheets

Contiued**

SYSTEM AND METHOD FOR PROCESSING VIRTUAL OBJECTS IN A COMPUTING ENVIRONMENT

TECHNICAL FIELD

The present disclosure generally relates to the field of processing of virtual objects. More particularly, the present disclosure relates to a system and method for processing virtual objects in a computing environment.

BACKGROUND

Computer-based and/or electronic gaming systems provide a shared virtual environment for many users to interact in a virtual world. The users can interact in the virtual environment and achieve various game objectives. Virtual treasure hunts are a well-known form of entertainment enjoyed by users of all ages. In a typical virtual treasure hunt game a player or players follow a series of clues that lead them to the treasures. A player's general location is verified by determining which page-base station is receiving the player's pager signal and the subsequent clues given only when the player is in the correct general location. However, many drawbacks of using means to determine the location, including inaccuracy and the requirement that the game be played on a scale of sufficient size such that players travel to differing base station coverage areas.

Accordingly, there is need to provide the players with more dynamic and engaging means beyond those conventionally available and allow interactions between the players and the map-based game board.

In the light of aforementioned discussion there exists a need for certain systems with novel methodologies that would overcome or ameliorate the above mentioned disadvantages.

BRIEF SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

An objective of the present disclosure is directed towards the present system that can be used for hiding dynamically generated virtual objects in different user working or living or travelling or entertainment locations for entertainment purpose. The users may be enabled to virtually navigate through the locations, wherein the virtual objects are hidden.

An objective of the present disclosure is directed towards users are able to create virtual objects at the user navigating virtual locations using the present system.

Exemplary embodiments of the present disclosure are directed towards a system and method for processing virtual objects in a computing environment.

According to an exemplary aspect, the method includes hiding a plurality of virtual objects at a plurality of user navigating virtual locations, wherein the hided plurality of virtual objects are dynamically generated in response to the plurality of user navigating virtual locations associated with a corresponding plurality of real-time locations.

According to an exemplary aspect, the method includes collecting the dynamically generated plurality of virtual objects by a user and dynamically generate the hided plurality of virtual objects at the plurality of user navigating virtual locations, whereby the user is enabled to use a plurality of virtual game objects for collecting the plurality of dynamically generated virtual objects within the plurality of user navigating virtual locations associated with the plurality of real-time locations.

According to an exemplary aspect, the method includes offering a plurality of virtual rewards to the user based on the collection of plurality of dynamically generated virtual objects within the plurality of user navigating virtual locations and offer a plurality of virtual rewards which can be processed for participating in an uber hunt.

According to an exemplary aspect, the method includes solving a plurality of interactive queries related to test ingenuity or knowledge of the user by using the plurality of virtual rewards for participating in the uber hunt, whereby at least one uber virtual object in the uber hunt is configured to provide a higher level rewards to the user once the uber virtual object is collected.

BRIEF DESCRIPTION OF DRAWINGS

Other objects and advantages of the present invention will become apparent to those skilled in the art upon reading the following detailed description of the preferred embodiments, in conjunction with the accompanying drawings, wherein like reference numerals have been used to designate like elements, and wherein.

DETAILED DESCRIPTION

Figure 1A:
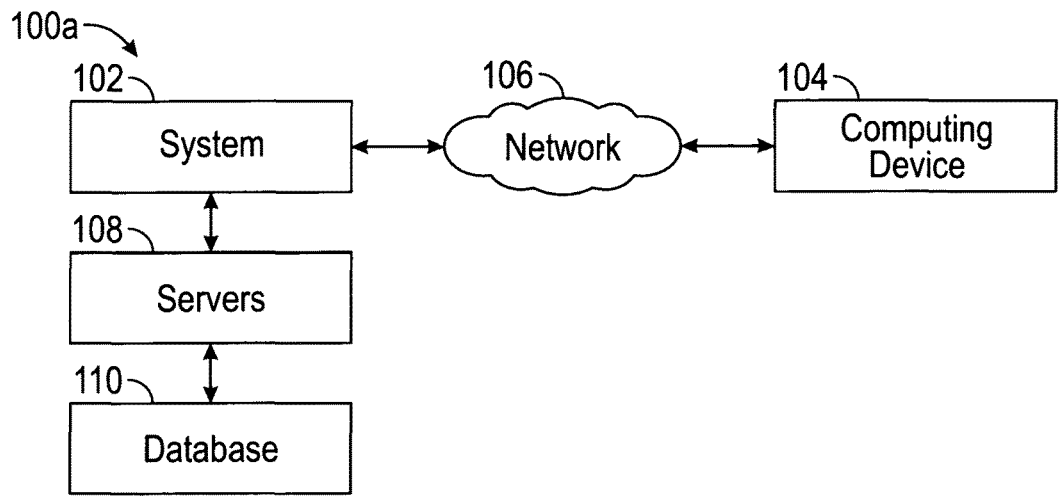
FIG. 1A is a block diagram depicting an environment for processing virtual objects in a computing environment, according to exemplary embodiments of the present disclosure.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and the like, herein do not denote any order, quantity, or importance, but rather are used to distinguish one element from another.

Referring to FIG. 1A is a block diagram 100a depicting an environment for processing virtual objects in a computing environment, according to exemplary embodiments of the present disclosure. The environment 100 depicts a system for dynamically generating and hiding the virtual objects at the user navigating virtual locations 102 associated with real-time locations (herein after referred as system 102), a computing device 104, a network 106, a server(s) 108 and database 110. The system 102 may be accessed as a mobile application, a web application, or other software application known in the art of future implemented, without limiting the scope of the present disclosure. The computing device 104 may include, but not limited to, a smart mobile or a tablet, a desktop or a computer, a laptop, or other similar handheld device operated in a network 106.

According to non-limiting exemplary embodiments of the present disclosure, the virtual objects here may be referred as virtual chests, virtual things, virtual powers, virtual weapons, trinkets or other suitable virtual objects or elements that are configured to engage and entertain the user. The user navigating virtual locations here may be, referred to augmented real-time geographic locations, geographical maps, without limiting the scope of the present disclosure. The real-time locations may include, but not limited to, real-time buildings, monuments, libraries, museums, or other suitable real world landmarks or objects. The virtual appearance of the real-time locations may be represented virtually in the computing device 104.

According to non-limiting exemplary embodiments of the present disclosure, the network 106 may be a local area network (LAN), a wide area network (WAN), or a combination of different networks, an internet or any cellular network by way of cellular technology such as GSM (global system for mobile communications), CDMA (code division multiple access), and AMPS (advanced mobile phone system). The server(s) 108 may be configured to provide virtual objects to the computing device 104 through the system 102 and the network 106.

According to non-limiting exemplary embodiments of the present disclosure, the server(s) 108 is configured to be in communication with the database 110. The database 110 may contain data records related to each user, game instances, game rules, administrative settings and other policies. Thus, the database 110 may contain data records related to each user, such as user identity credentials, personal information, wager preferences, account settings, play history, and on the like. Additionally, the database 110 may contain administrative settings that may control the operations of the processing of virtual objects and the interaction and capabilities of user, including data related to the rewards, reward tier configurations, payout rules, privacy settings, social networking limitations and features, login requirements, and other information.

Figure 1B:
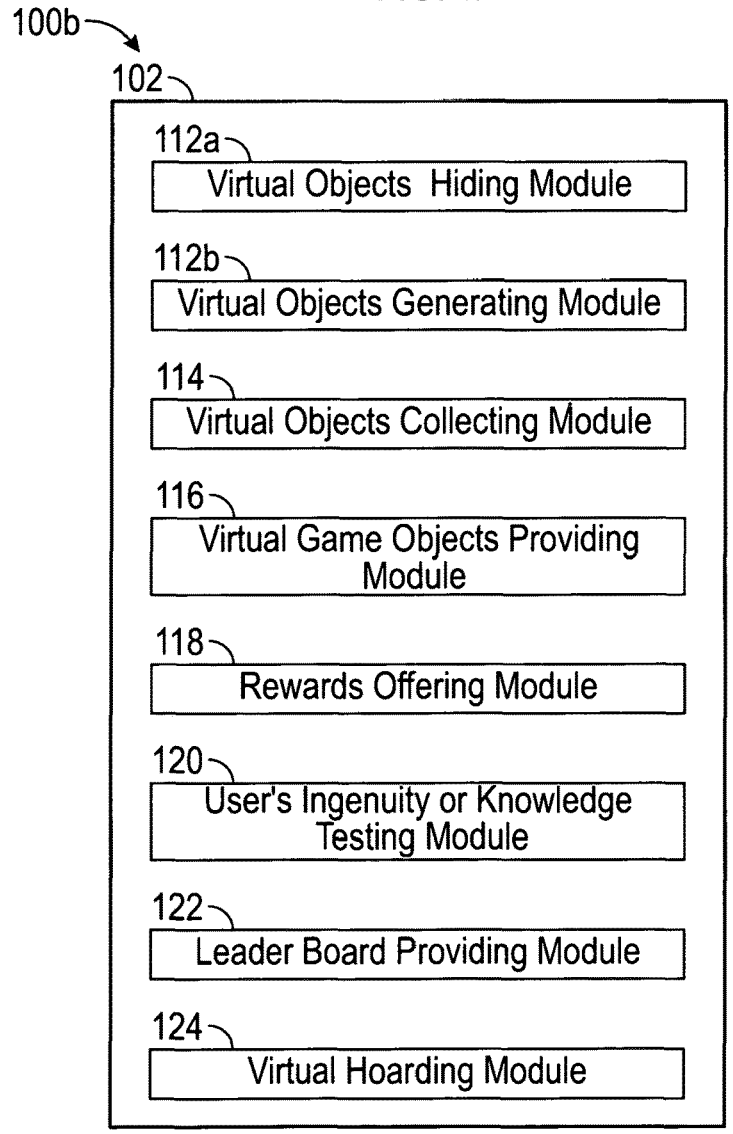
FIG. 1B is a block diagram depicting system 102 disclosed in FIG. 1A, according to exemplary embodiments of the present disclosure.

Referring to FIG. 1B is a block diagram 100b depicting system 102 disclosed in FIG. 1A, according to exemplary embodiments of the present disclosure. The system 102 further includes a virtual objects hiding module 112a, a virtual objects dynamic generating module 112b, a virtual objects collecting module 114, a virtual game objects providing module 116, a virtual rewards offering module 118, a user's ingenuity or knowledge testing module 120, a leader board providing module 122, and a virtual hoarding module 124.

The virtual objects hiding module 112a is configured to hide the virtual objects at the user navigating virtual locations associated with the corresponding real-time locations. The virtual objects dynamic generating module 112b is configured to dynamically generate the hided virtual objects at the user navigating virtual locations. The virtual objects collecting module 114 is configured to collect the virtual objects by the user in the computing device 104. The virtual game objects providing module 116 is configured to provide virtual game objects to the user for collecting the virtual objects within the user navigating virtual locations. Here the user navigating virtual locations are the associated with the corresponding real-time locations by augmenting in real-time. The virtual game objects may include, but not limited to, game trinkets, crystal balls, dual doubloon game objects, magic locks, golden shovels, parrots, swords, truth serum, spy glass, fog of war and the like.

The virtual rewards offering module 118 is configured to offer virtual rewards to the user based on the collected virtual objects within the user navigating virtual locations. The rewards may include, but not limited to, virtual prizes, virtual diamonds, virtual gold coins, virtual coupons, virtual gift cards, virtual currency, virtual tickets, and the like. The user's ingenuity or knowledge testing module 120 is configured to provide interactive queries related to test the ingenuity or knowledge of the user. The user may get a chance to participate in an uber hunt by solving the interactive queries using the offered rewards. The offered rewards may be used for obtaining clues to solve the interactive queries. The uber hunt, here may, may be a next higher level of the game and the user may get higher level rewards for collecting the uber virtual object in the uber hunt. The user may use the virtual game objects providing module 116 to reveal if an uber virtual object is available or not. If the user finds the uber virtual object, then the user may get higher level rewards on collection of uber virtual object in the uber hunt. The higher level rewards may include, but not limited to, real currency, real gift cards and the like. The higher level rewards may be used for app purchases provided by the business partners who place advertisements and purchase treasure stations. The uber virtual object here may be referred as virtual chest, virtual things, virtual powers, virtual weapons or other suitable virtual objects or elements. The value of the uber virtual object may be increased by making a proportion of the purchases go towards it while ensuring the proportion is dialed up and dialed down depending on its correlation to the amount of investment made into the uber hunt. In addition, the uber virtual object value may be increased proportional to the purchases made in that real-time location.

The leader board providing module 122 is configured to view the most collected rewards by the user, most distance covered by the user, and the rewards collected by the user. The virtual hoarding module 124 is configured to provide virtual hoardings and publish the advertisements on the hoardings at the user navigating virtual locations. The virtual hoardings may be placed on the small portions of the virtual objects at the user navigating virtual locations. The virtual hoardings may be created dynamically and publish the advertisements on the virtual hoardings at the user navigating virtual locations by the virtual hoarding module 124. The virtual hoardings may be placed on virtual flying objects at the user navigating virtual locations for displaying advertisements to the users. The virtual flying objects may include, but not limited to, virtual aviation vehicles, virtual flying balloons and the like. The virtual objects value may be increased based on the published advertisements. Here, the advertisements revenue may be given to the user in the form of rewards for the collection of virtual objects. The advertisements may be in the form of animated images, static images, in the form of an audio presentation such as an audio commercial, in the form of video presentation such as television commercial, on the hoardings. The images, slideshows, videos and audio may be presented to the users on a website at the hoardings. The advertisements may include applications provided by the business partners. The virtual hoardings may be presented in user navigating virtual locations associated with the corresponding real-time locations. The system 102 may be referred by the user to other users to sign up and play the game by offering rewards to them through social networking platforms. The system 102 allows the users to post the processing of virtual objects in the social networking platforms which may include, social networking sites (e.g., Facebook), collaborative projects (e.g., Wikipedia), blogs and micro blogs (e.g., Twitter), content communities (e.g., YouTube), and the like without limiting the scope of the present disclosure.

Some example versions are explained how the system 102 applicable to the users. Here, the users may able to run morale events by creating virtual objects at the user working places by using the system 102. The virtual objects are identifiable by different branding on the virtual objects and may declare a winner once the virtual object is found. The working places are also able to come up with clues to feed into the system 102. The working places may include, but not limited to, companies, organizations, firms, corporate, institutes, associates, and the like.

The users may be able to run morale events by creating virtual objects at the user living places. The users may go to a room and use the system 102 to place a virtual object in the room of the place. Once the virtual object is set, the other users are able to go each room and find out where the virtual object is present.

Figure 2:
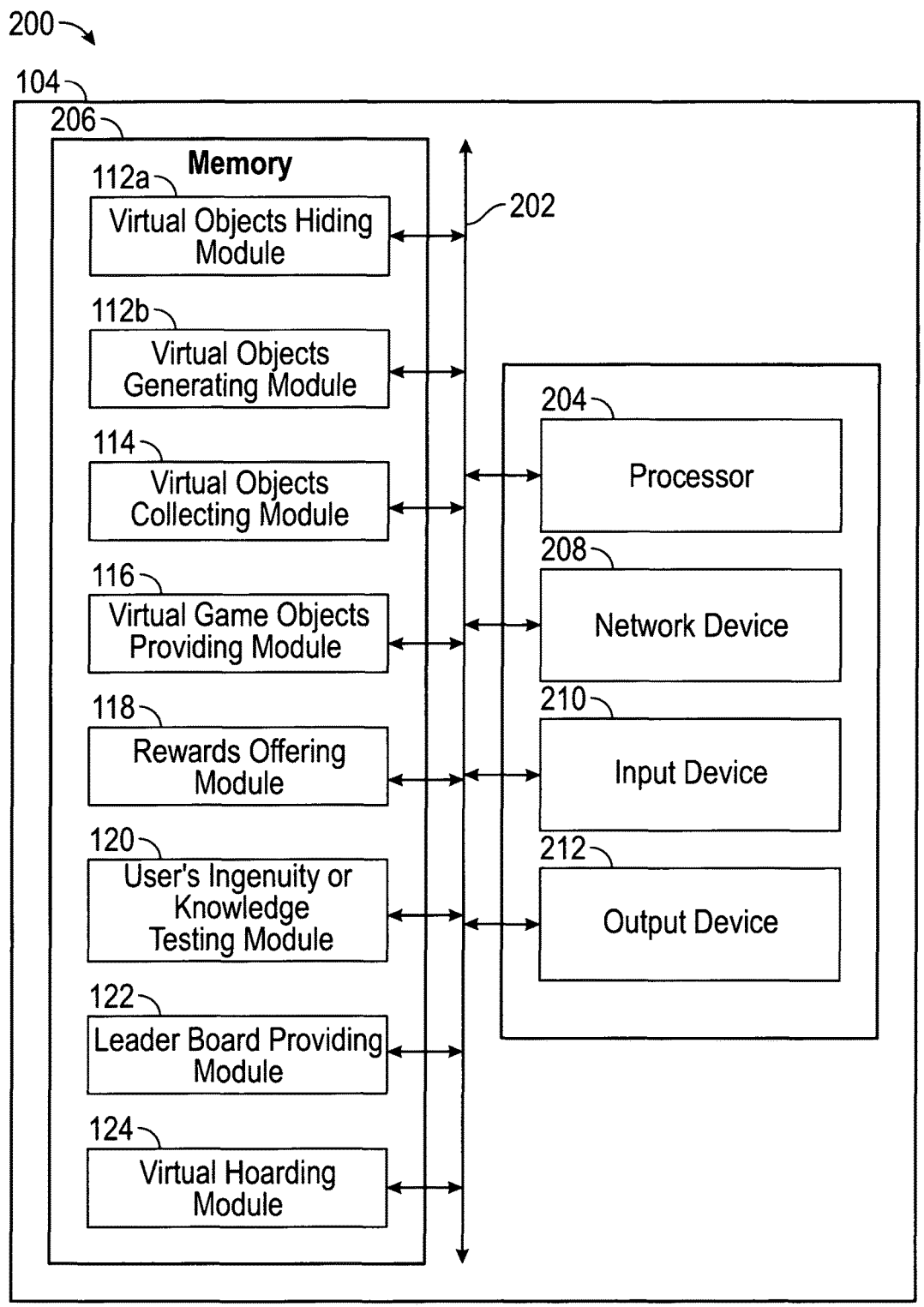
FIG. 2 is a block diagram depicting the computing device 104 disclosed in FIG. 1A, according to an exemplary embodiment of the present disclosure.

Referring to FIG. 2 is a block diagram 200 depicting the computing device 104 disclosed in FIG. 1A, according to an exemplary embodiment of the present disclosure. It should be noted, however, that embodiments are not limited to implementation on such computing devices, but may be implemented on any of a variety of different types of computing units within the scope of embodiments hereof. The computing device 104 is only one example of search and it is not intended to suggest any limitation as to the scope of use or functionality of the disclosure.

In some embodiments, the computing device 104 may include a bus 202, a processor 204, a memory 206, a network device 208, an input device 210, and an output device 212. The bus 202 may include a path that permits communication among the components of the computing device 104.

The memory 206 may stores the modules of the system 102 which are the virtual objects hiding module 112a, virtual objects dynamic generating module 112b, the virtual objects collecting module 114, the virtual game objects providing module 116, the virtual rewards offering module 118, the user's ingenuity or knowledge testing module 120, the leader board providing module 122, and the virtual hoarding module 124.

The memory 206 may be any type of computer memory known in the art or future-developed for electronically storing data and/or logic, including volatile and non-volatile memory. In this regard, memory 206 can include random access memory (RAM), read-only memory (ROM), flash memory, any magnetic computer storage unit, including hard disks, floppy discs, or magnetic tapes, and optical discs.

The processor 204 comprises processing hardware for interpreting or executing tasks or instructions stored in the memory 206. Note that the processor 204 may be a microprocessor, a digital processor, or other type of circuitry configured to run and/or execute instructions.

The network device 208 may be any type of network unit (e.g., a modem) known in the art or future-developed for communicating over a network device 208.

The input device 210 is any type of input unit known in the art or future-developed for receiving data. As an example, the input unit 210 may be a keyboard, a mouse, a touch screen, a serial port, a scanner, a camera, or a microphone.

The output device 212 may be any type of output unit known in the art or future-developed for displaying or outputting data. As an example, the output device 212 may be a liquid crystal display (LCD) or other type of video display unit.

Figure 3:
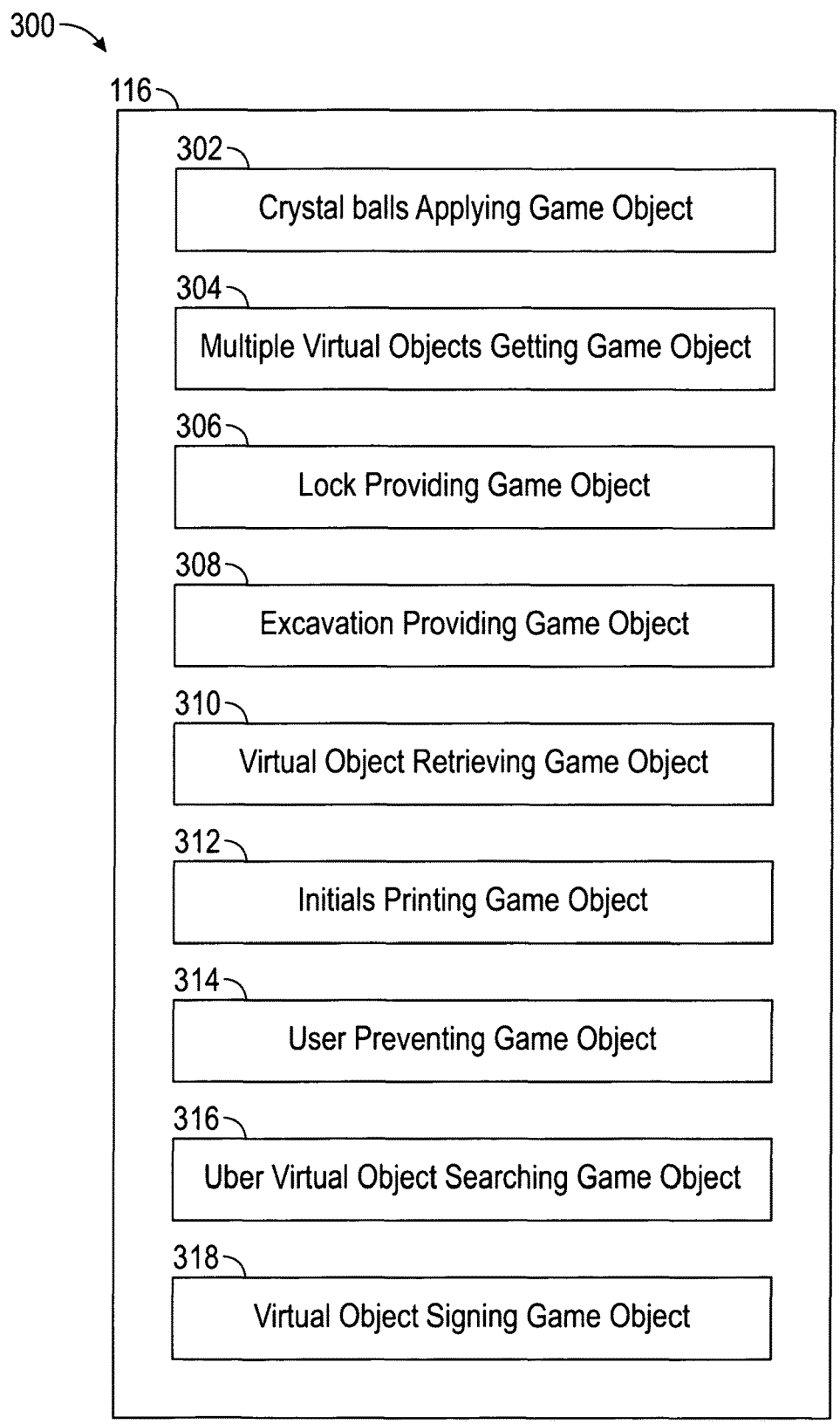
FIG. 3 is a block diagram depicting a virtual game objects providing module, according to exemplary embodiments of the present disclosure.

Referring to FIG. 3 is a block diagram 300 depicting a virtual game objects providing module, according to exemplary embodiments of the present disclosure. The virtual game objects providing module 116 further includes a crystal balls applying game object 302, a multiple virtual objects getting game object 304, a lock providing game object 306, an excavation providing game object 308, a virtual objects retrieving game object 310, a initials printing game object 312 a user preventing game object 314, a uber virtual object searching game object 316, and a virtual object signing game object 318.

The crystal balls applying game object 302 is configured to apply on the locations for seeing the virtual objects on the user navigating locations. The multiple virtual objects getting game object 304 is configured to double or triple the virtual objects by opening this object. The lock providing game object 306 is configured to apply on the virtual objects for locking that no one is able to open the virtual objects. The excavation providing game object 308 is configured to allow the user to excavate and see the virtual objects within a predefined radius of the current location.

The virtual objects retrieving game object 310 is configured to help the user by retrieving the virtual objects at the user navigating virtual locations. The virtual objects retrieving game object 310 may include a green parrot game object for retrieving the virtual objects at the user navigating virtual locations corresponding real-time locations. The virtual objects retrieving game object 310 may be fed up the user's virtual navigation location by the user that unlocked the clues to receive the virtual objects and the virtual objects retrieving game object 310 is also configured to unlock the contents of the virtual objects at the user navigating virtual locations.

The initials printing game object 312 is configured to print the user initials on the virtual objects for others to see. The user preventing game object 314 is configured to prevent the user on the locations from seeing objections. The objections like fog of war, and the like, without limiting the scope of the present disclosure. The uber virtual object searching game object 316 is configured for searching to see if the uber virtual object is present in the user navigating virtual locations. The uber virtual object searching game object 316 may include a golden parrot for searching to see if the uber virtual object is present in the user navigating virtual locations. The users are able to remotely collect the virtual objects and the uber virtual object by the virtual objects retrieving game object 310 and the uber virtual object searching game object 316. The virtual objects signing game object 318 is configured to sign the virtual object with user names for letting other users who made it there first. The virtual object signing game object 318 is configured to The virtual game objects providing module 116 further includes a teleport may use to considerably change the scene of the game. The entire look and feel may be changed to the users by the teleport and the virtual game objects.

Figure 4A:
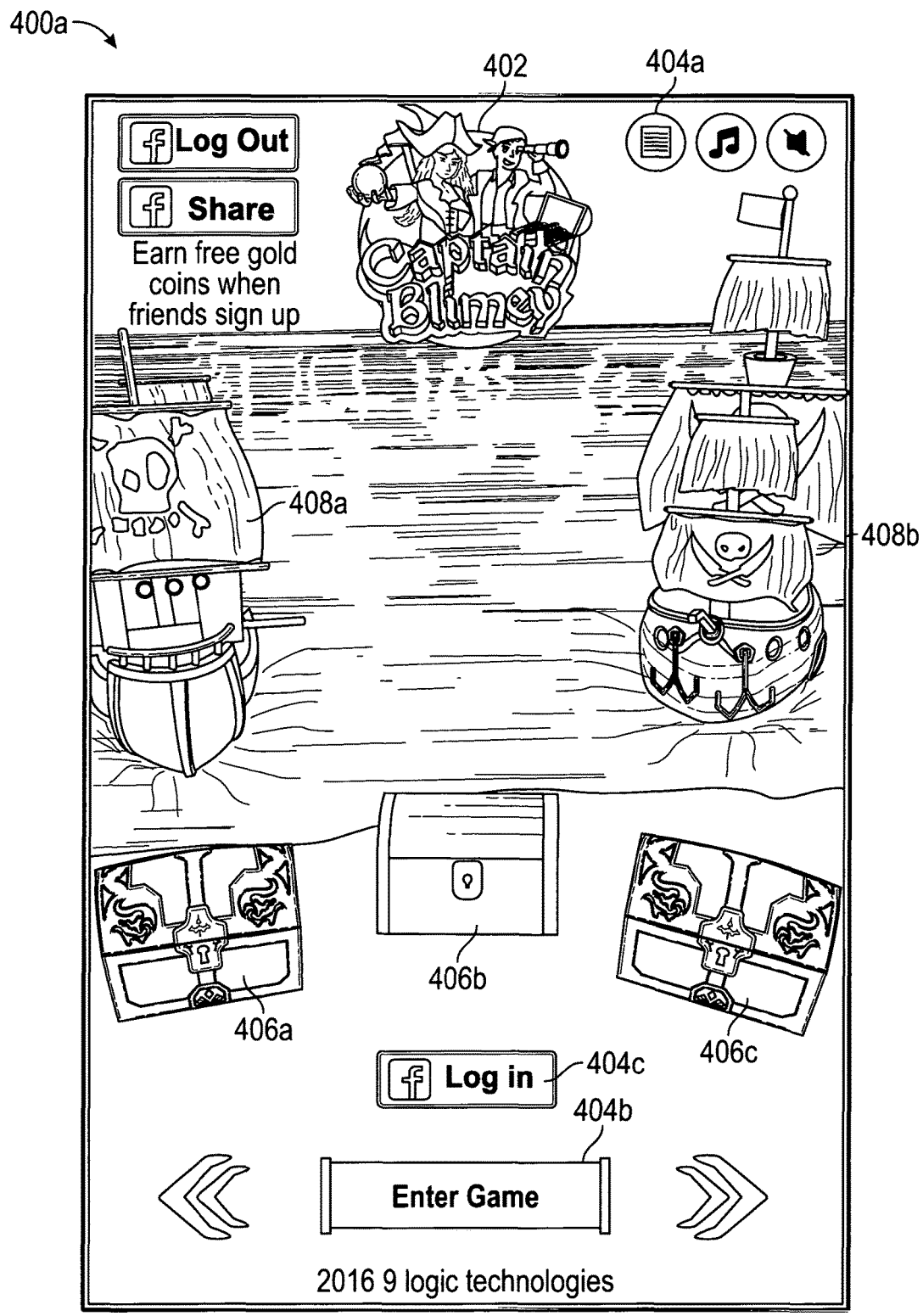
FIG. 4A-4C are diagrams depicting example screens for processing virtual objects, according to exemplary embodiments of the present disclosure.
Figure 4B:
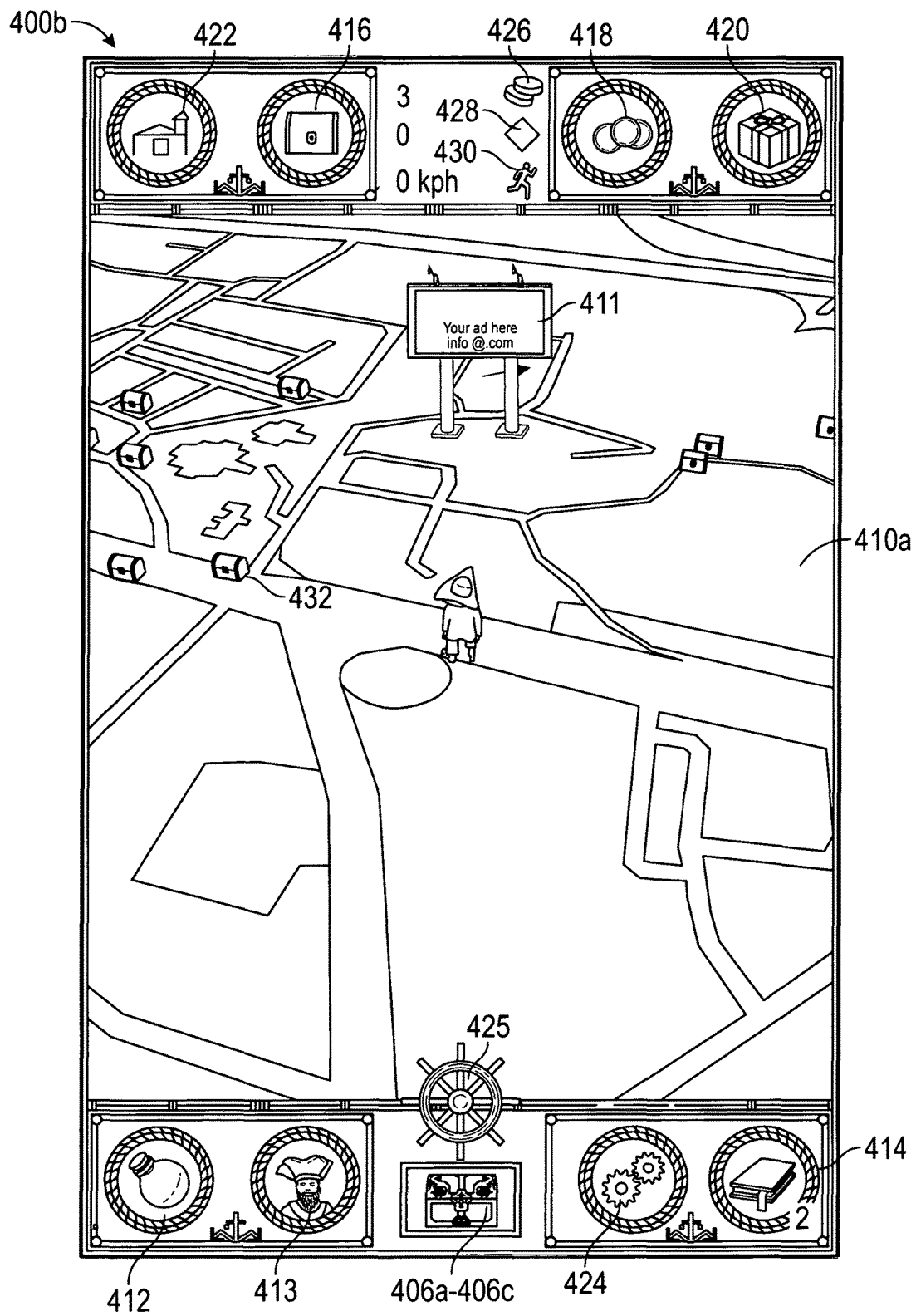
Figure 4C:
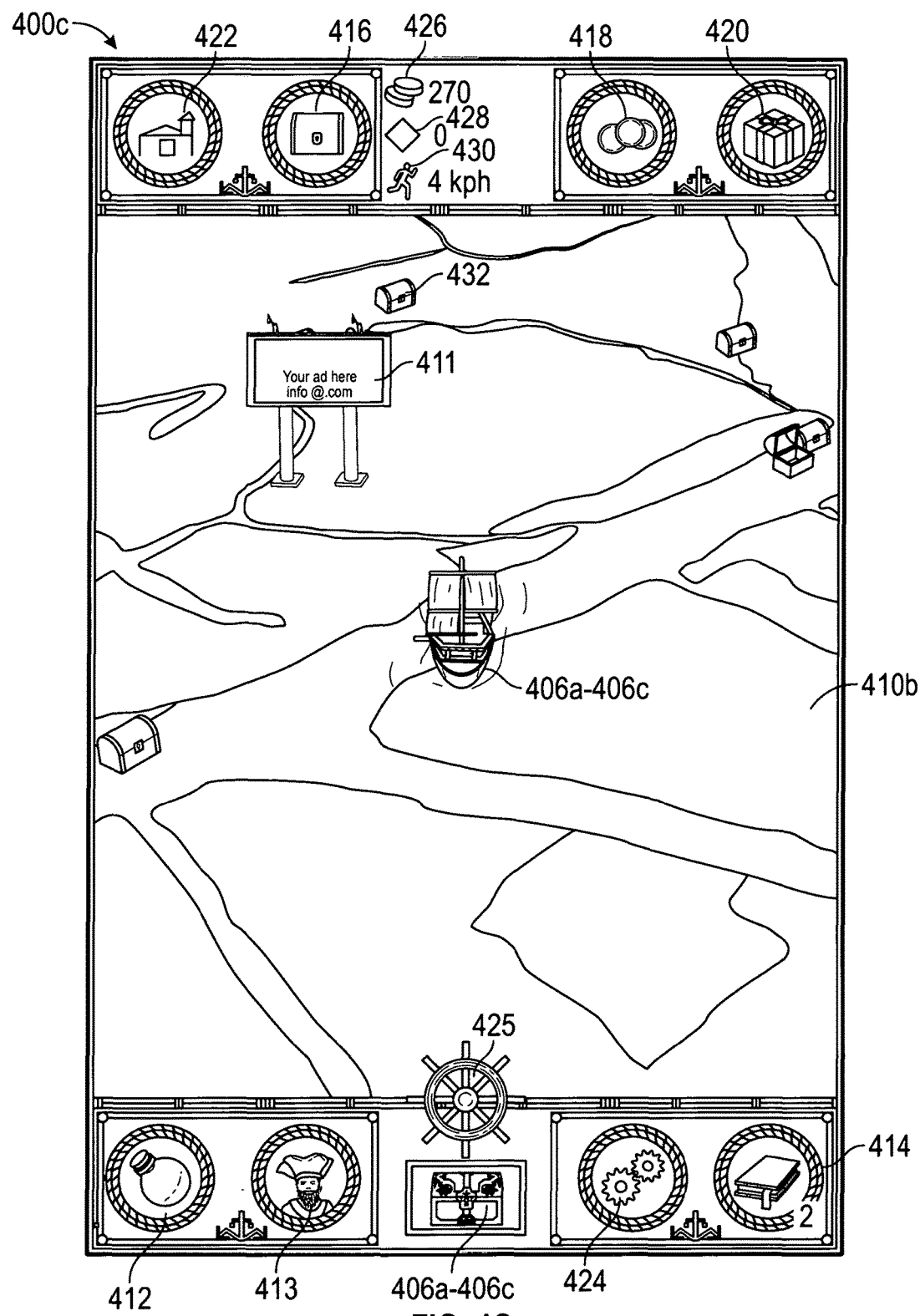
Figure 4D:
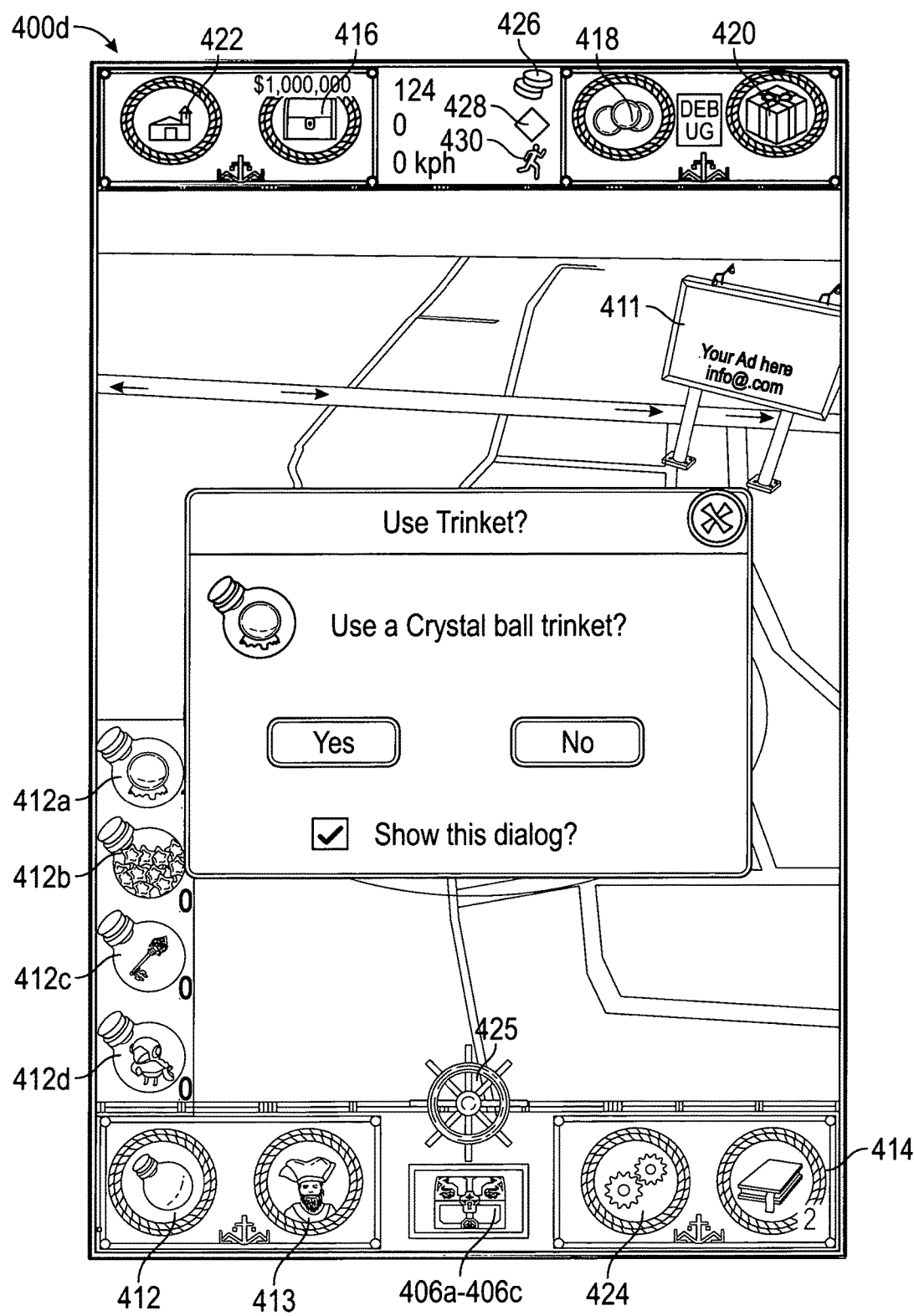
FIG. 4D-FIG. 4G are diagrams depicting example screens for applying virtual game objects within locations, according to exemplary embodiments of the present disclosure.
Figure 4E:
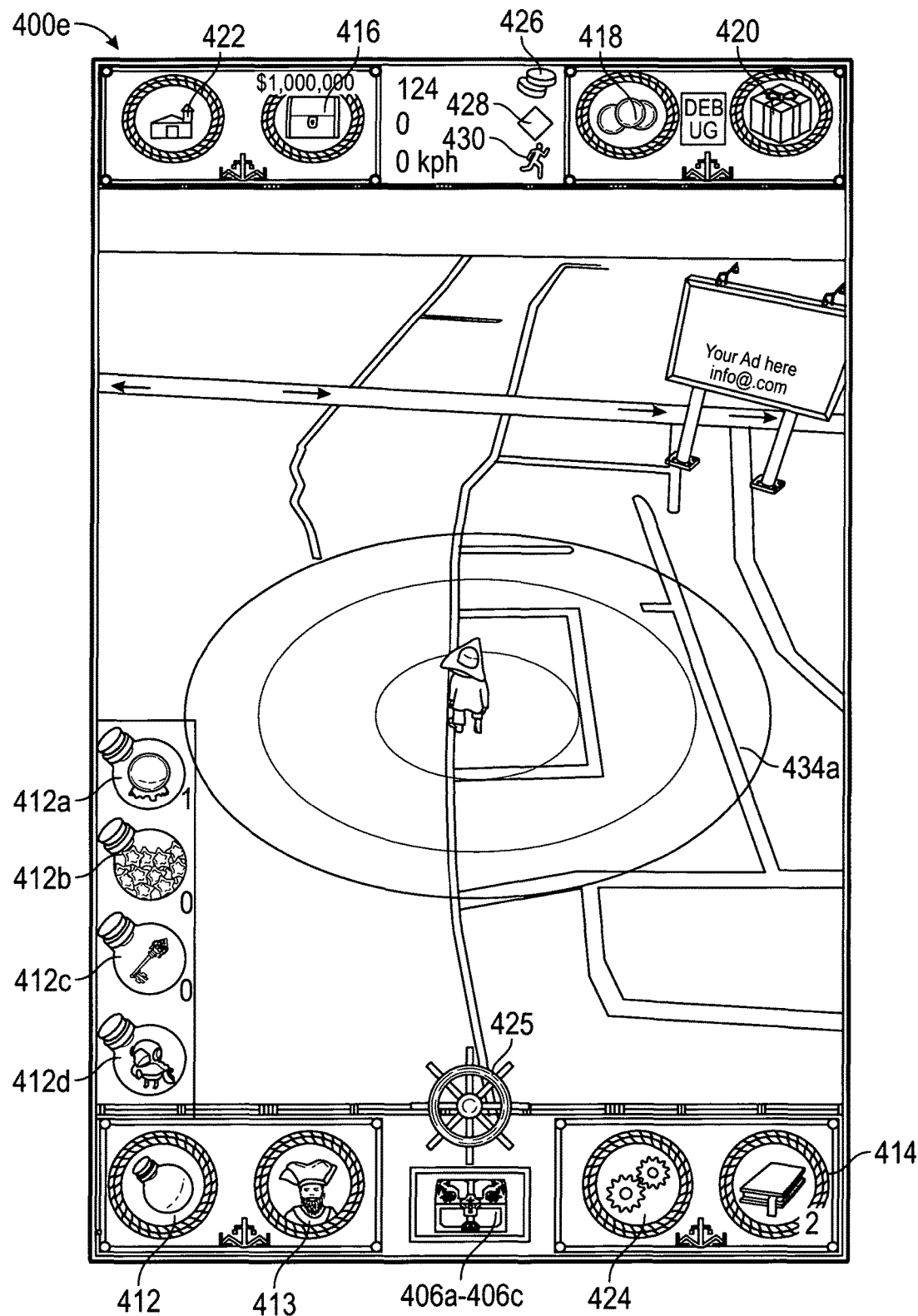
Figure 4F:
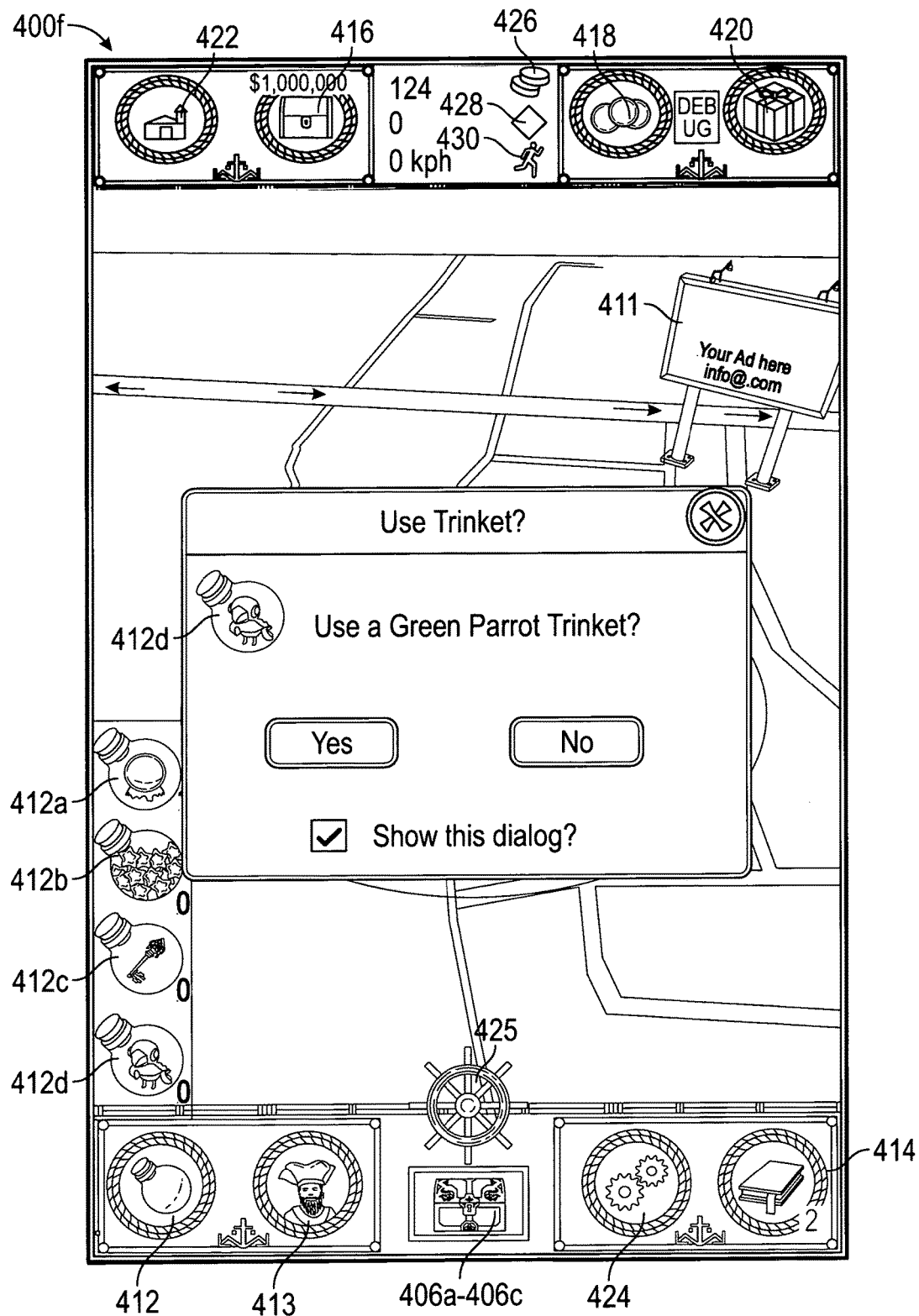
Figure 4G:
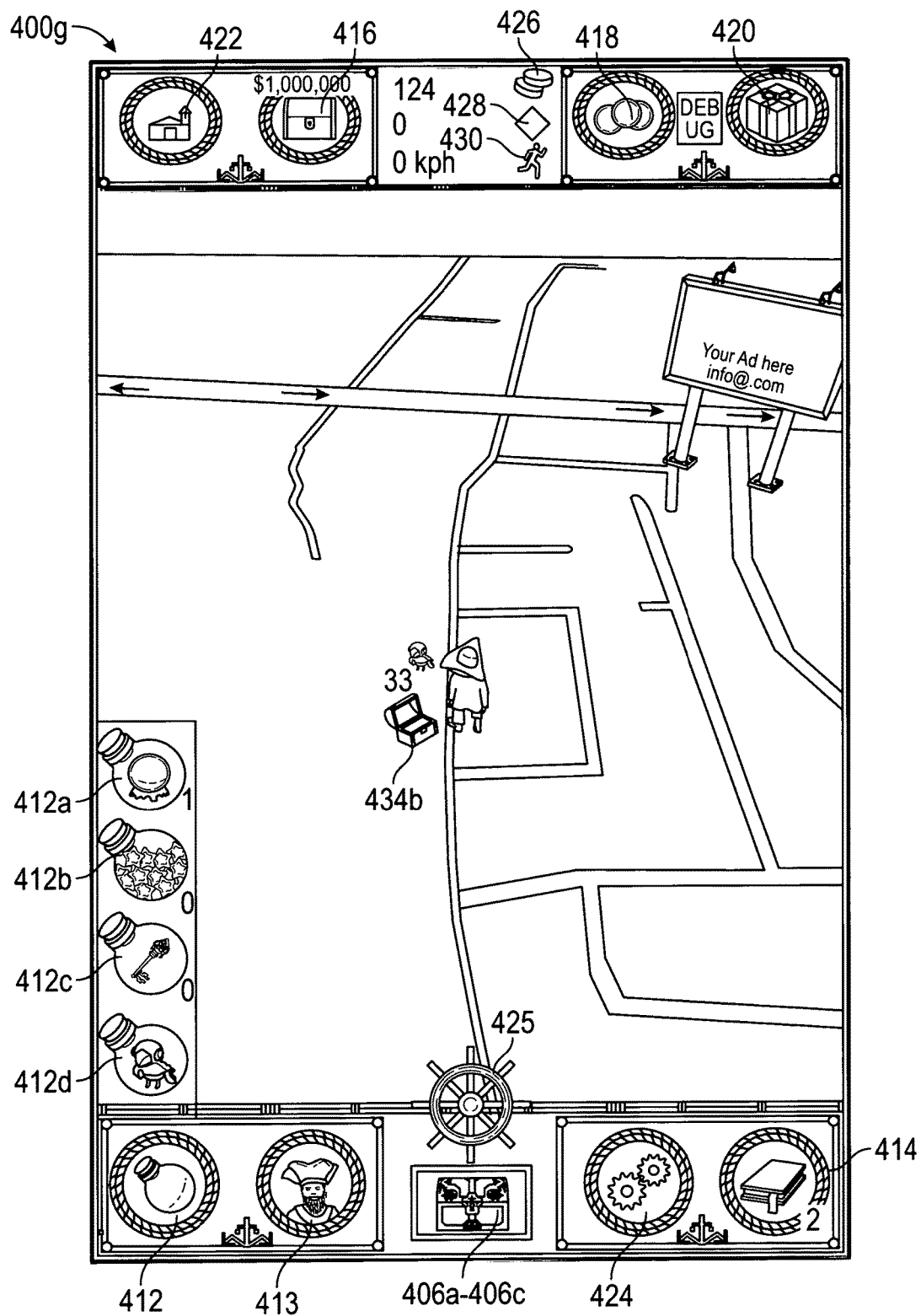
Figure 4H:
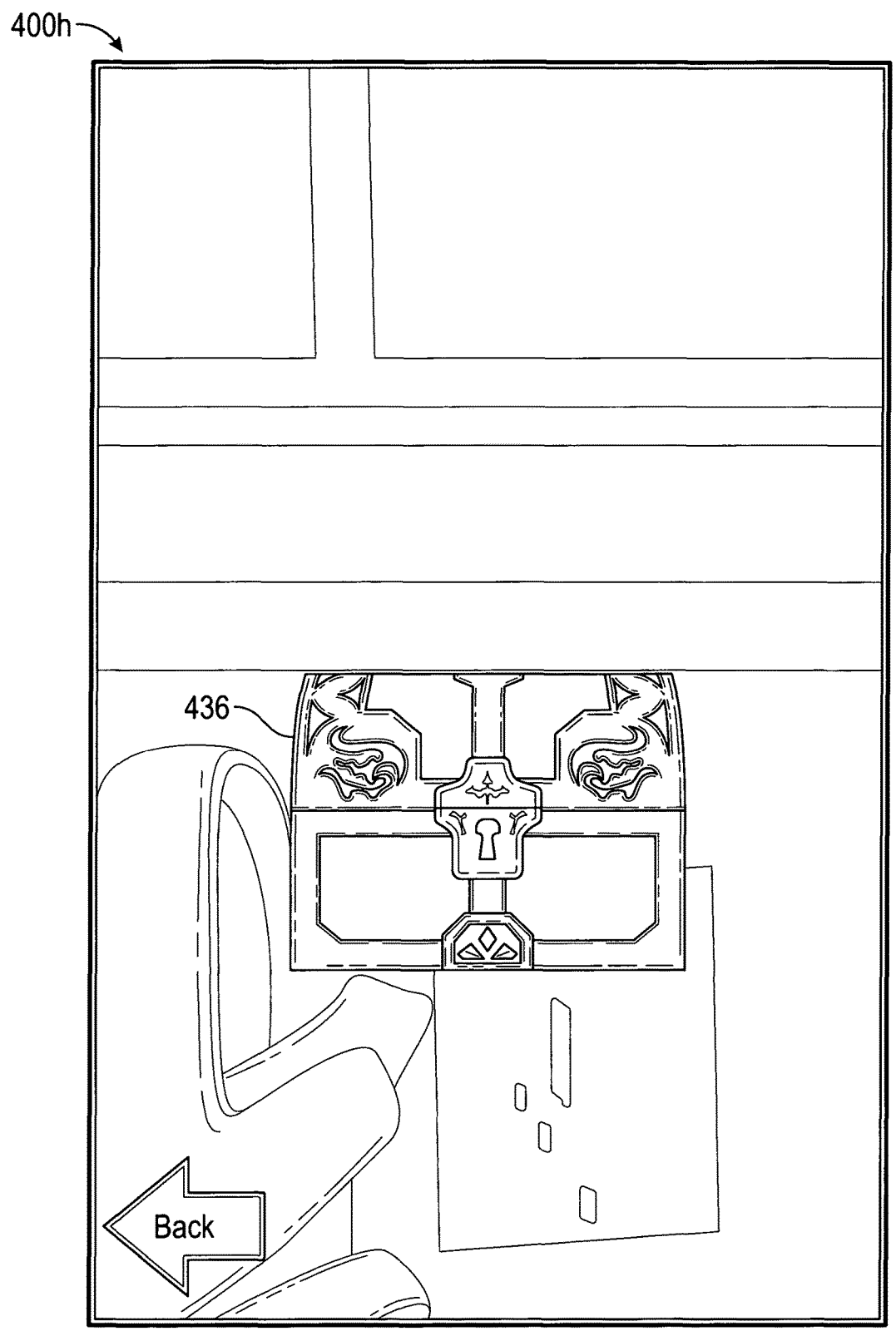
FIG. 4H-FIG. 4K are diagrams depicting example screens for viewing virtual objects, according to exemplary embodiments of the present disclosure.
Figure 4I:
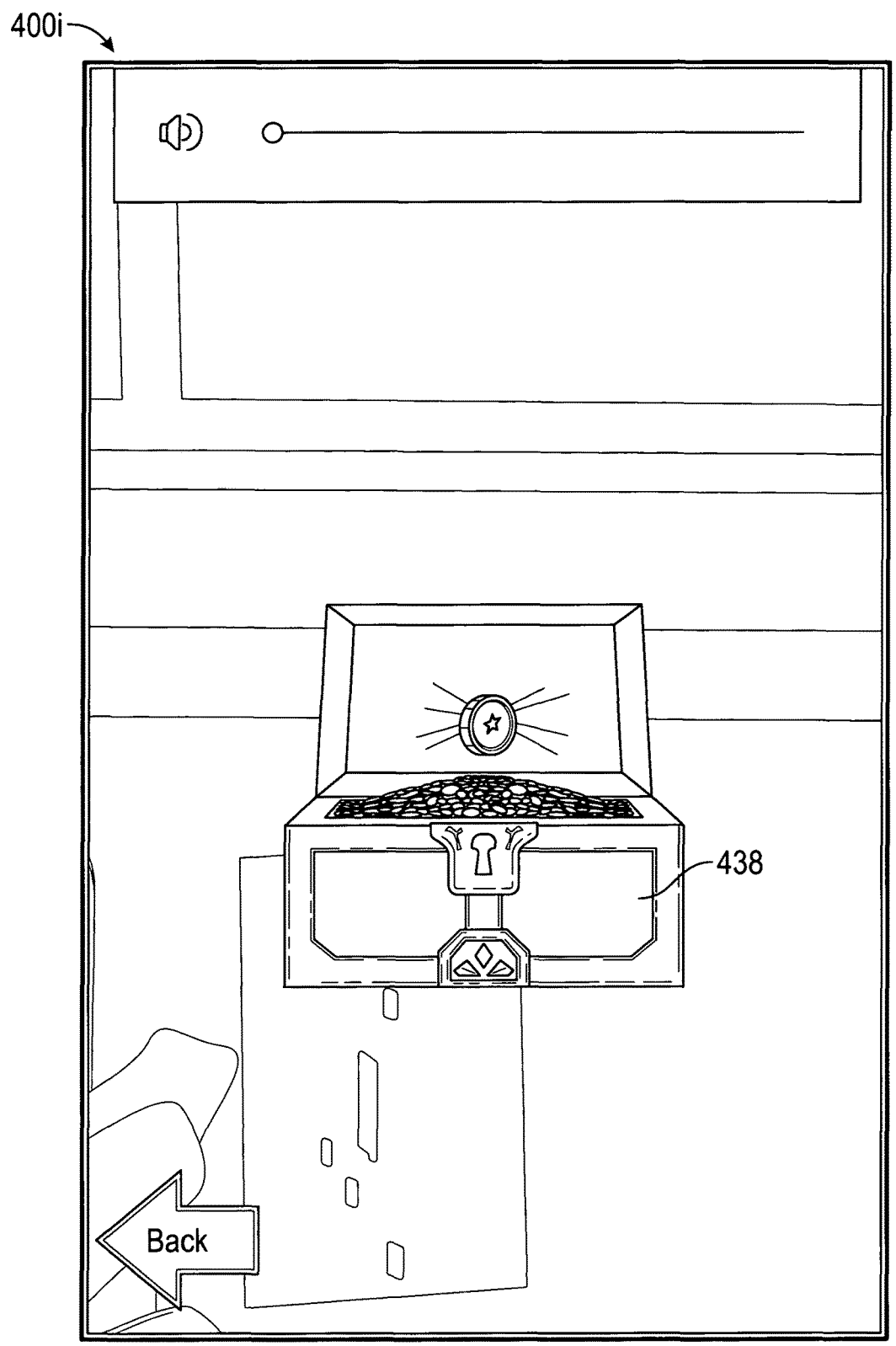
Figure 4J:
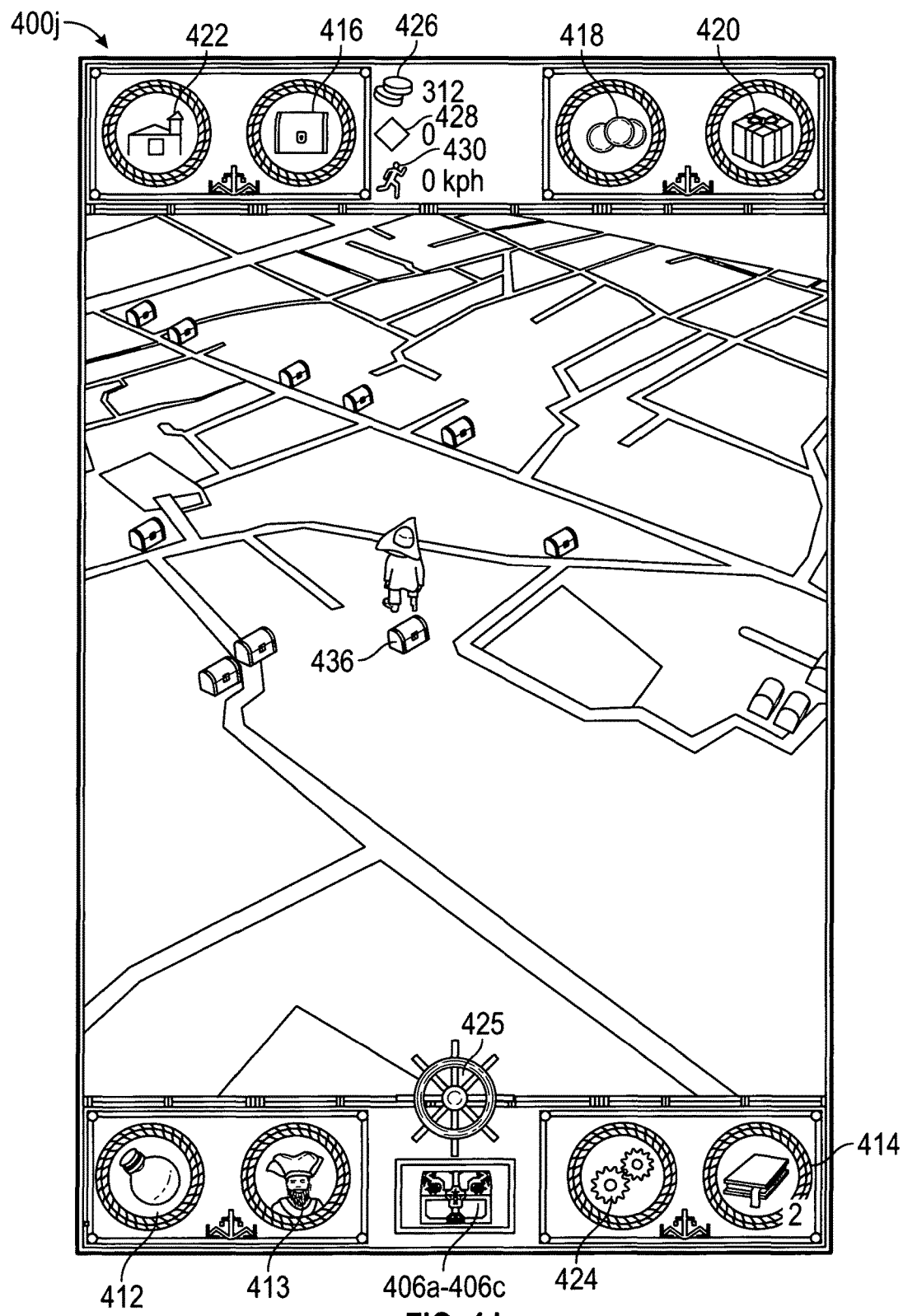
Figure 4K:
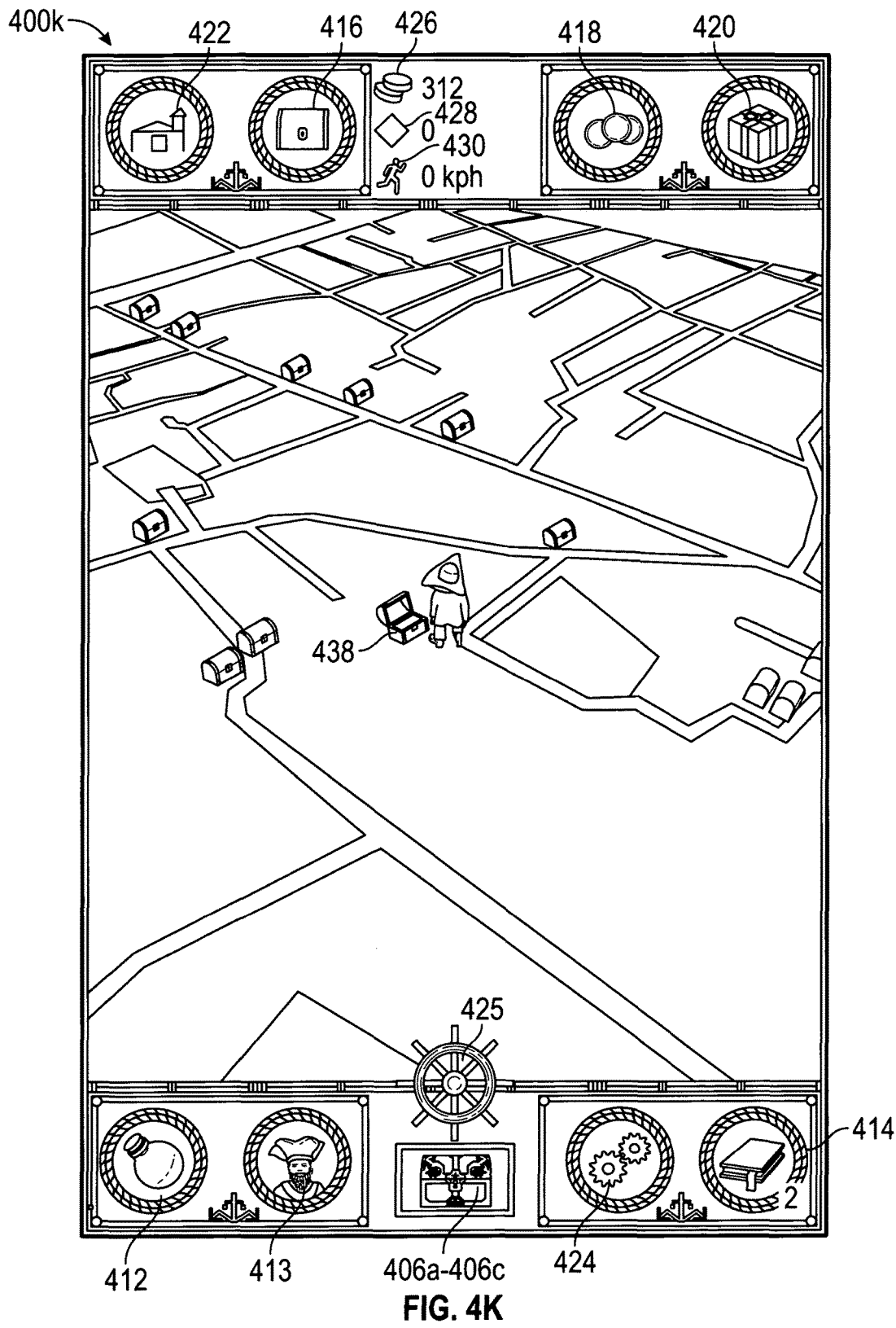

Referring to FIG. 4A-4C area diagrams 400a-400c depicting example screens for processing virtual objects within locations by interacting in the computing device, according to exemplary embodiments of the present disclosure. The system 102 may be configured to provide screens 400a-400c in the computing device 104.

The screens 400a includes a logo 402, menu icon 404a, enter game icon 404b, log in icon 404c (for example through face book login), virtual object selecting icons 406a-406c, and pirate ships 408a-408b. The user selects on the menu icon 404, login icon, an instructions icon, an about us icon may appear on the screen 400a. The user may be able to start the adventure after selecting the enter game icon 404b. The user may able to play the game by logging using the social networking account 404c (e.g., Facebook), The screens 400b-400c further depict virtual user navigating location, which may include, travelled by land screen 410a and travelled by sea screen 410b for the adventure. The travelled by land screen 410a and the travelled by sea screen 410b further includes a virtual hoarding icon 411, a virtual objects selecting icon 406a-406c, a game object icon 412, a leader board icon 413, a notification icon 414, a collected currency appearing icon 416, a coins storage icon 418, a gift cards icon 420, a home icon 422, and a settings icon 424. The screens 400b-400c further include a speed detector icon 425, a collected coins icon 426, a number of prizes collected icon 428, a total distance travelled icon 430, and virtual objects 432 on the locations.

The user may go on foot 410a or use pirate ship 408a-408b for the adventure. When the user finds out the virtual object 432 on the locations, the user may turn on the device camera by selecting on the virtual object selecting icon 406a-406c in the bottom center of the screen and collect the virtual object 432. The virtual hoarding icon 411 is configured to display the advertisements. The game object icon 412 may be configured to provide various virtual game objects by selecting on the game object icon 412. The leader board icon 413 may for moving to leader board screen on clicking. The notification icon 414 may be enabled to provide the latest updates or notifications. The collected currency appearing icon 416 may be configured to view the collected currency in the screen. The collected currency appearing icon 416 may also used to participate in the uber hunt.

The coin storage icon 418 may depict the storage of coins and gift cards icon 420 may be configured to provide contents of the gift card screen. The home icon 422 may be for move onto home screen. The settings icon 424 may be for providing settings of the game to the user. The speed detector icon 425 may be configured to detect the speed of the user. The collected coins icon 426 may depict number of collected coins. The number of prizes collected icon 428 may depict the total number of collected prizes. The total distance travelled icon 430 may depict the travelled distance of the user.

Referring to FIG. 4D-FIG. 4G are diagrams 400d-400g depicting example screens for applying virtual game objects within locations, according to exemplary embodiments of the present disclosure. The screens 400d-400g depicts virtual game objects icons 412a-412d on selecting the virtual game object icon 412. The virtual game object icon 412a may be a crystal ball applying game object icon. Once we click on the virtual game object icon 412a, the appearance 434a is shown in the screen 400e. The virtual game object icon 412d may be a parrot applying game object icon. Once we click on the virtual game object icon 412d, the virtual object 434b is collected in the screen 400g.

Referring to FIG. 4H-FIG. 4K are diagrams 400h-400k depicting example screens for viewing virtual objects selecting icon, according to exemplary embodiments of the present disclosure. The screens 400h-400k depict before tapping the virtual object selecting icon 436 and after tapping the virtual selecting icon 438 for getting virtual rewards. The screen 400h-400k depicts the virtual object selecting icon 436 in virtual real mode.

Figure 4L:
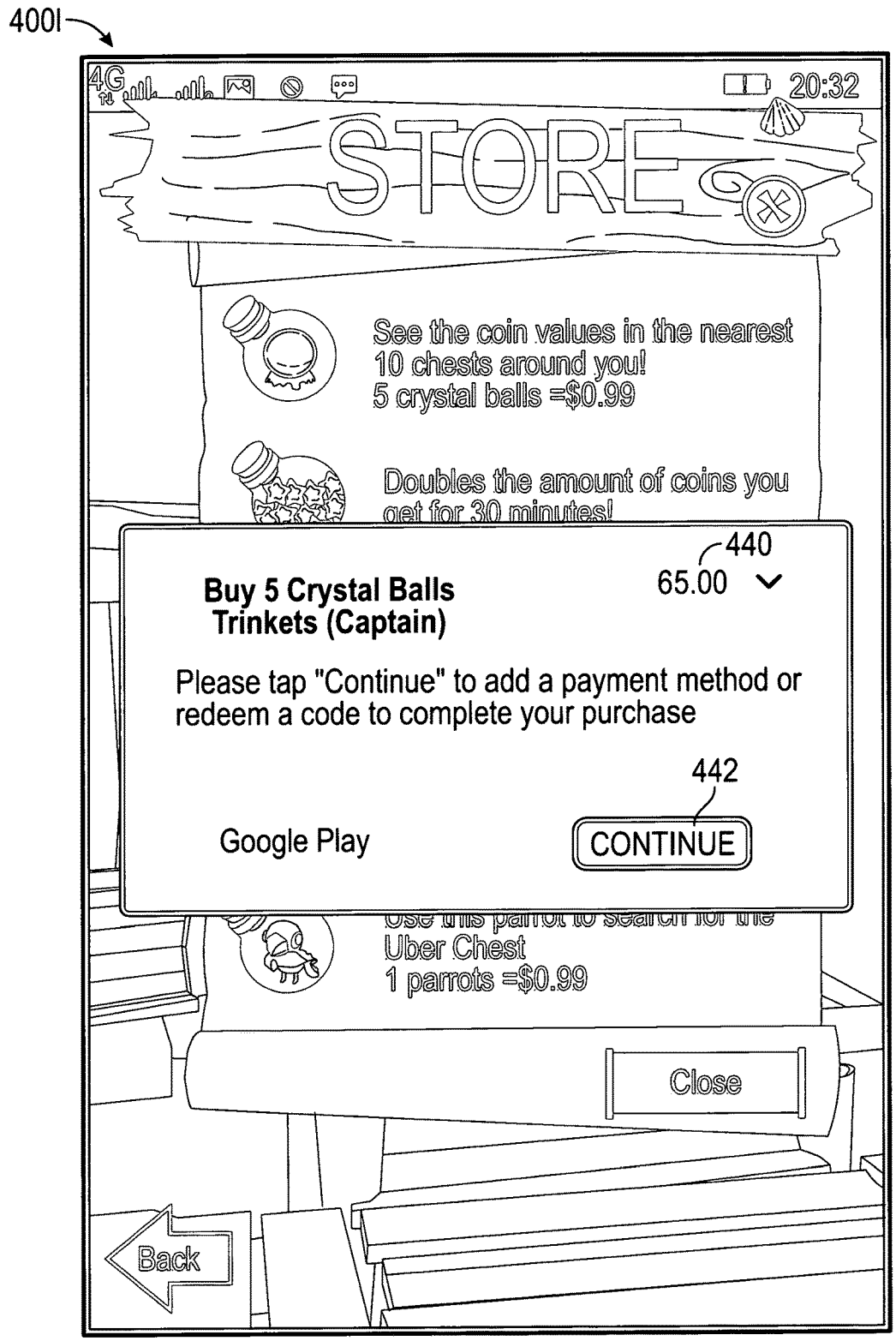
FIG. 4L-FIG. 4M are diagrams depicting example of store screens, according to exemplary embodiments of the present disclosure.
Figure 4M:
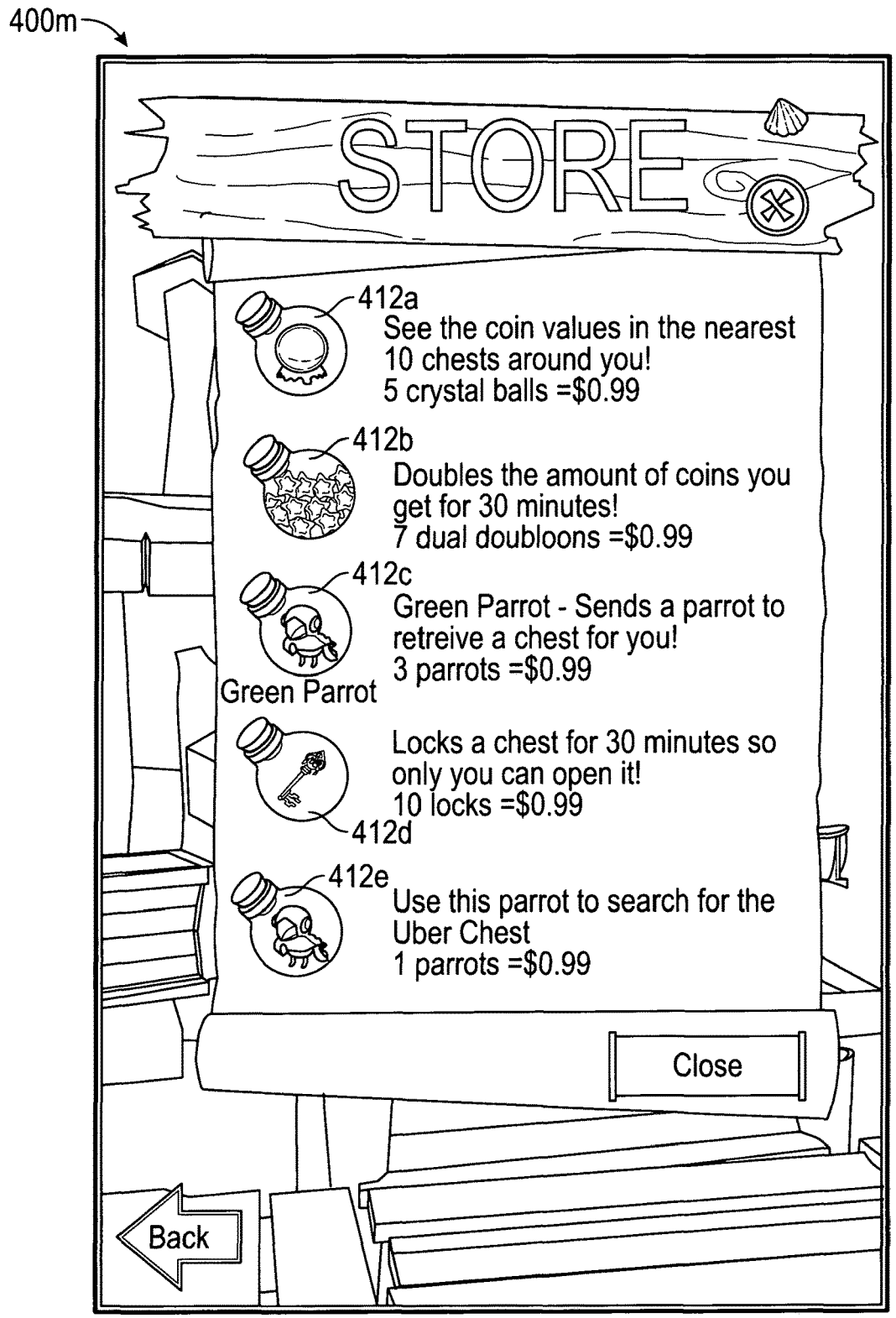

Referring to FIG. 4L-FIG. 4M are diagrams 400l-400m depicting example screens of store screens, according to exemplary embodiments of the present disclosure. The screens 400l-400m depicting virtual game objects icons 412a-412e. The virtual game objects icons 412a-412e may be purchased at determined currency 440 in the screen 400l. The user may get the virtual game object icons 412a-412e after click on the continue icon 442 in the screen 400l. the virtual game object icons 412a-412e may include the crystal balls applying game object, the multiple virtual objects getting game object, the lock providing game object, the excavation providing game object, the virtual objects retrieving game object, the initials printing game object, the user preventing game object, the uber virtual objects searching game object, the virtual object signing game object and the like without limiting the scope of the present disclosure.

Figure 4N:
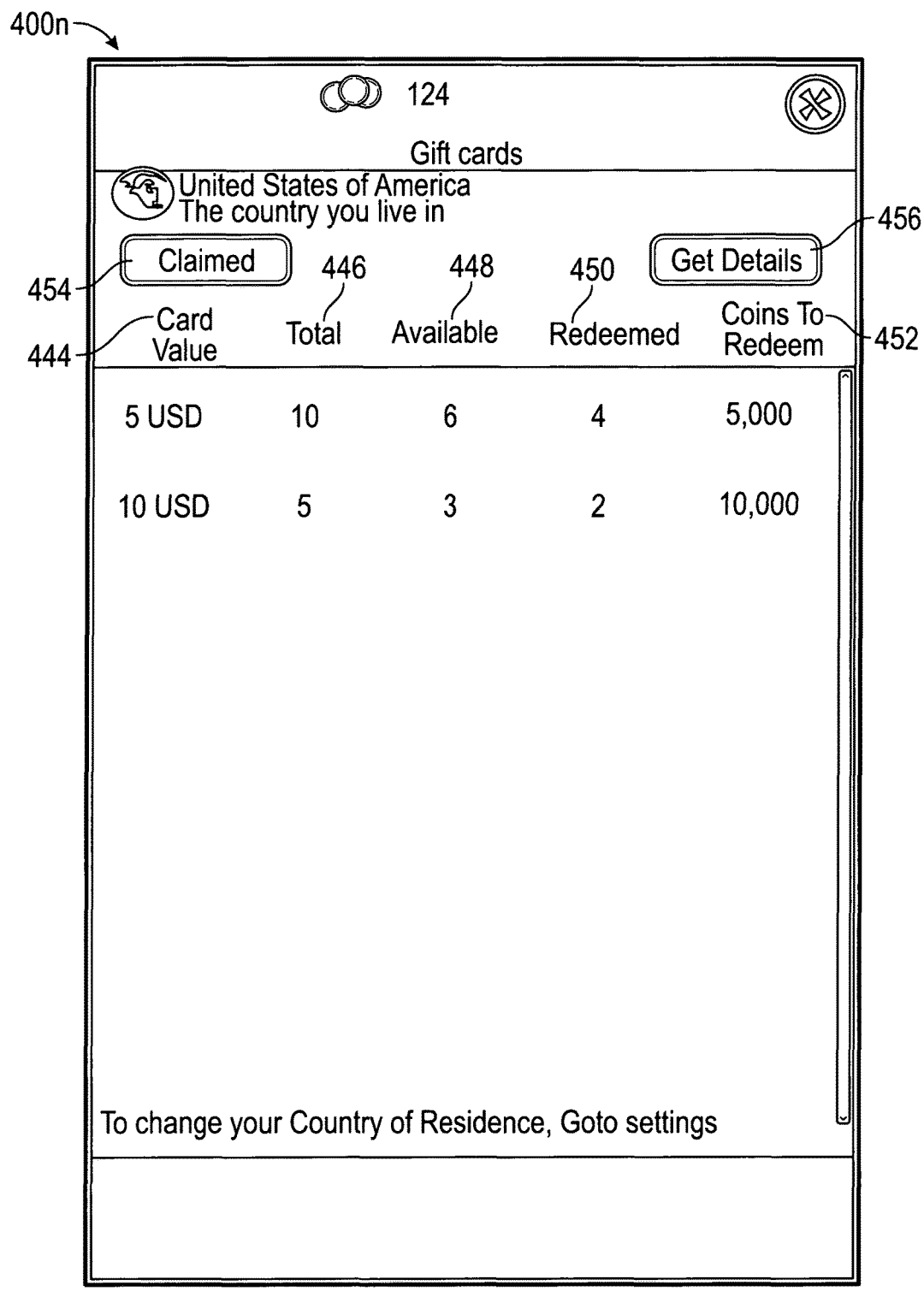
FIG. 4N-FIG. 4O are diagrams depicting example of gift card screens, according to exemplary embodiments of the present disclosure.
Figure 4O:
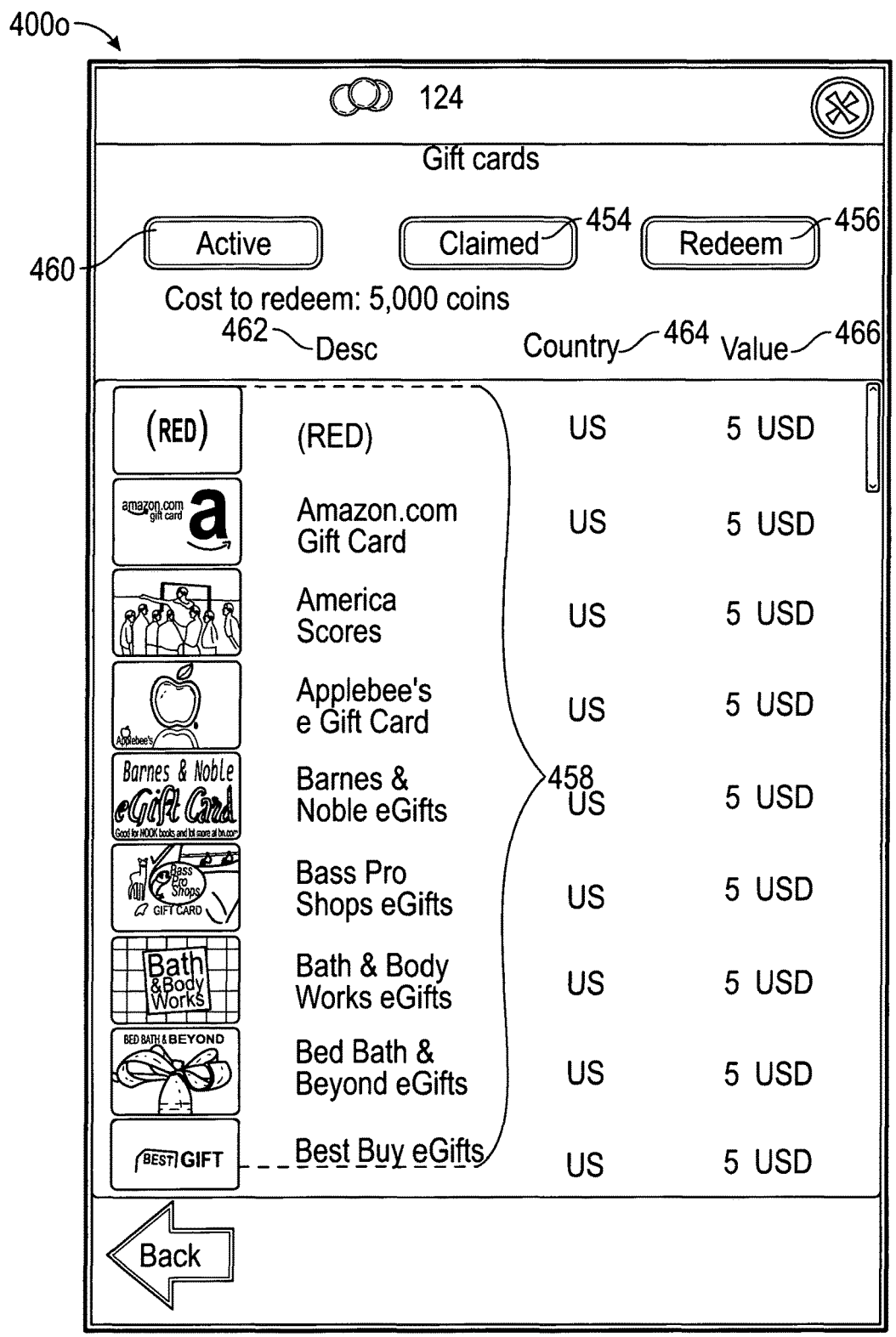

Referring to FIG. 4N-FIG. 4O are diagrams 400n-400o depicting example screens of gift card screens, according to exemplary embodiments of the present disclosure. The screens 400n-400o depicts gift cards contents. The screens 400n-400o includes a card value 444, a total number 446, available cards 448, a redeemed 450, and coins to redeem 452. The card value 444 includes value of the currency which may be in dollars, rupees, and the like. The value of the currency depends upon the country of selection in the settings. The total number 446 includes total number of cards. The redeemed 450 may include number of cards usage to get virtual coins. The coins to redeem 452 includes number of coins redeemed based on the redeemed cards. The available cards 448 may include number of available cards after usage. The screen 400*l* further includes claimed 454, and the get details 456. The claimed 454 may be a total number of claimed cards. The get details 456 may be for getting details about gift cards and the like without limiting the scope of the present disclosure.

The screen 400*o* further includes list of gift cards 458, an active icon 460, description 462, country 464 and the value 466. The active icon 460 may be configured for active the gift cards. The description 462 may include the details of the each gift card and the country 464 may include the name of the selected country. The value 466 may include values of the each gift card.

Figure 4P:
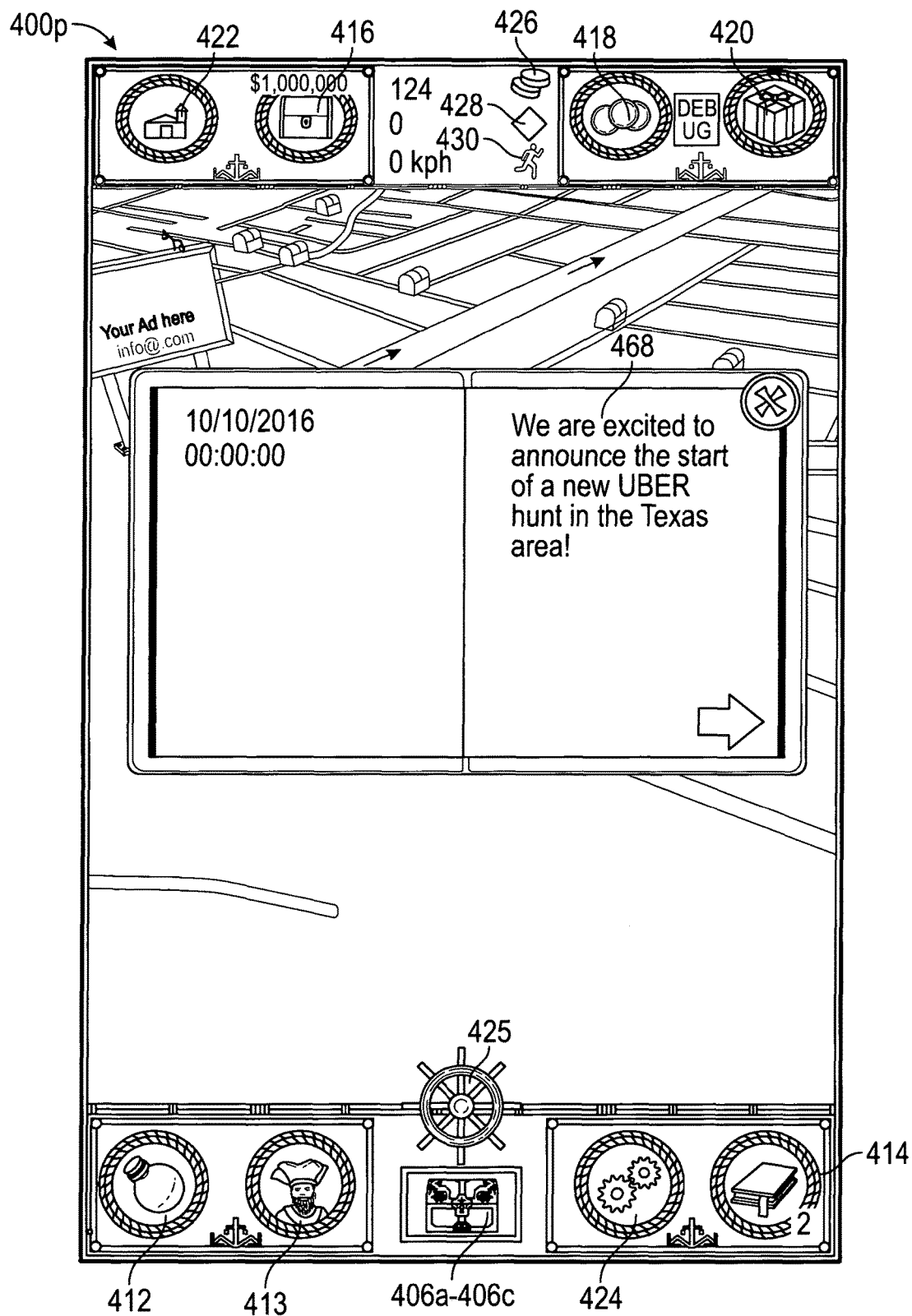
FIG. 4P is diagram depicting an example screen for the activation of notification screen, according to exemplary embodiments of the present disclosure.

Referring to FIG. 4P is a diagram 400*p* depicting an example screen for the activation of notification screen, according to exemplary embodiments of the present disclosure. The notification screen 400*p* depicts the notifications 468 after click on the notification icon 414. The notification screen 400*p* which gives latest notifications, news or updates of the game.

Figure 4Q:
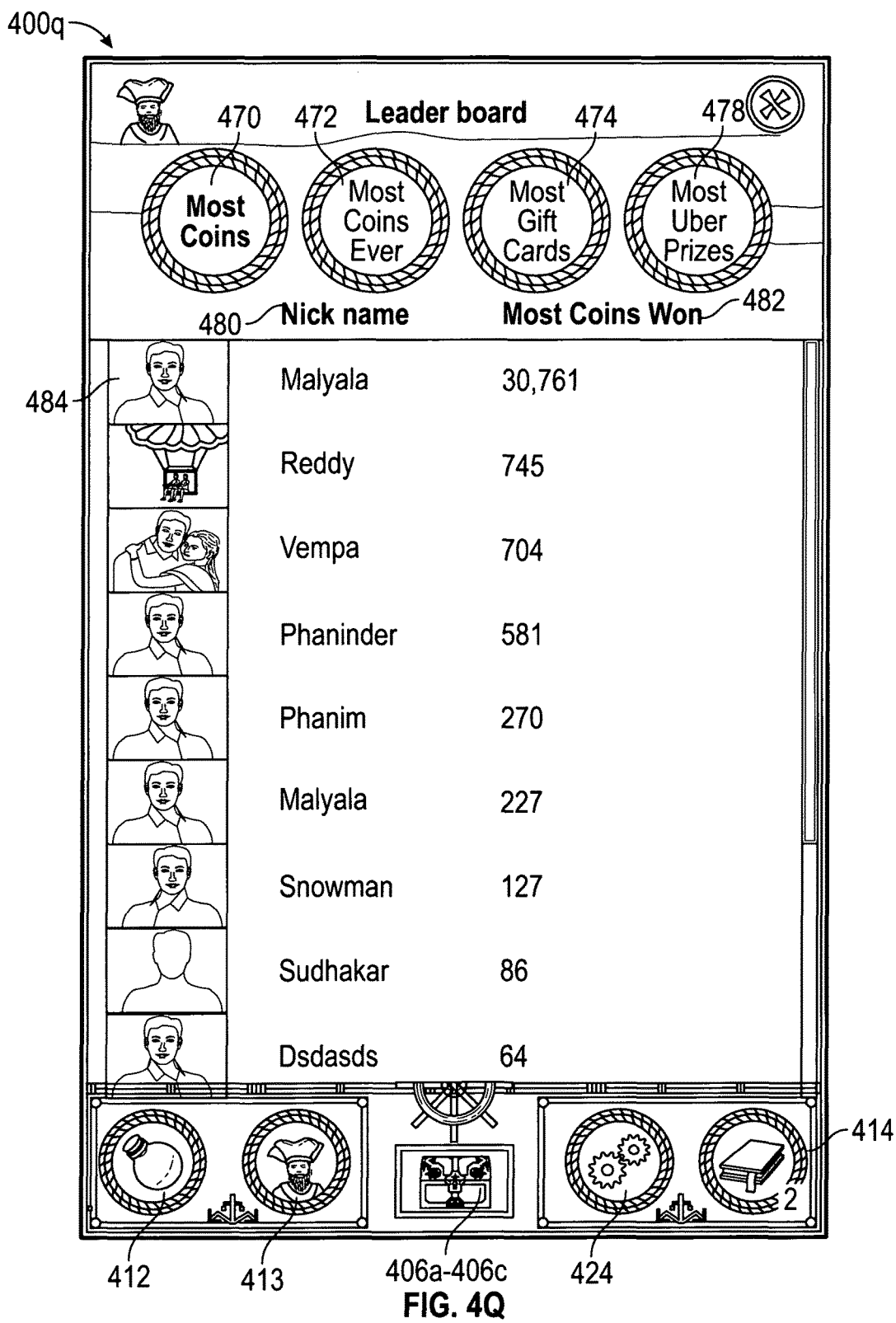
FIG. 4Q is a diagram depicting an example screen for viewing leader board screen, according to exemplary embodiments of the present disclosure.

Referring to FIG. 4Q is a diagram 400*q* depicting an example screen for viewing leader board screen, according to exemplary embodiments of the present disclosure. The screen 400*q* depicts icons which are most coins 470, most coins ever 472, most gift cards 474, and the most uber prizes 478. The screen 400*q* also depicts name of the user 480, most coins won 482 and a user profile 484. The user competes with other users to top in the leader board screen 400*q*.

Figure 4R:
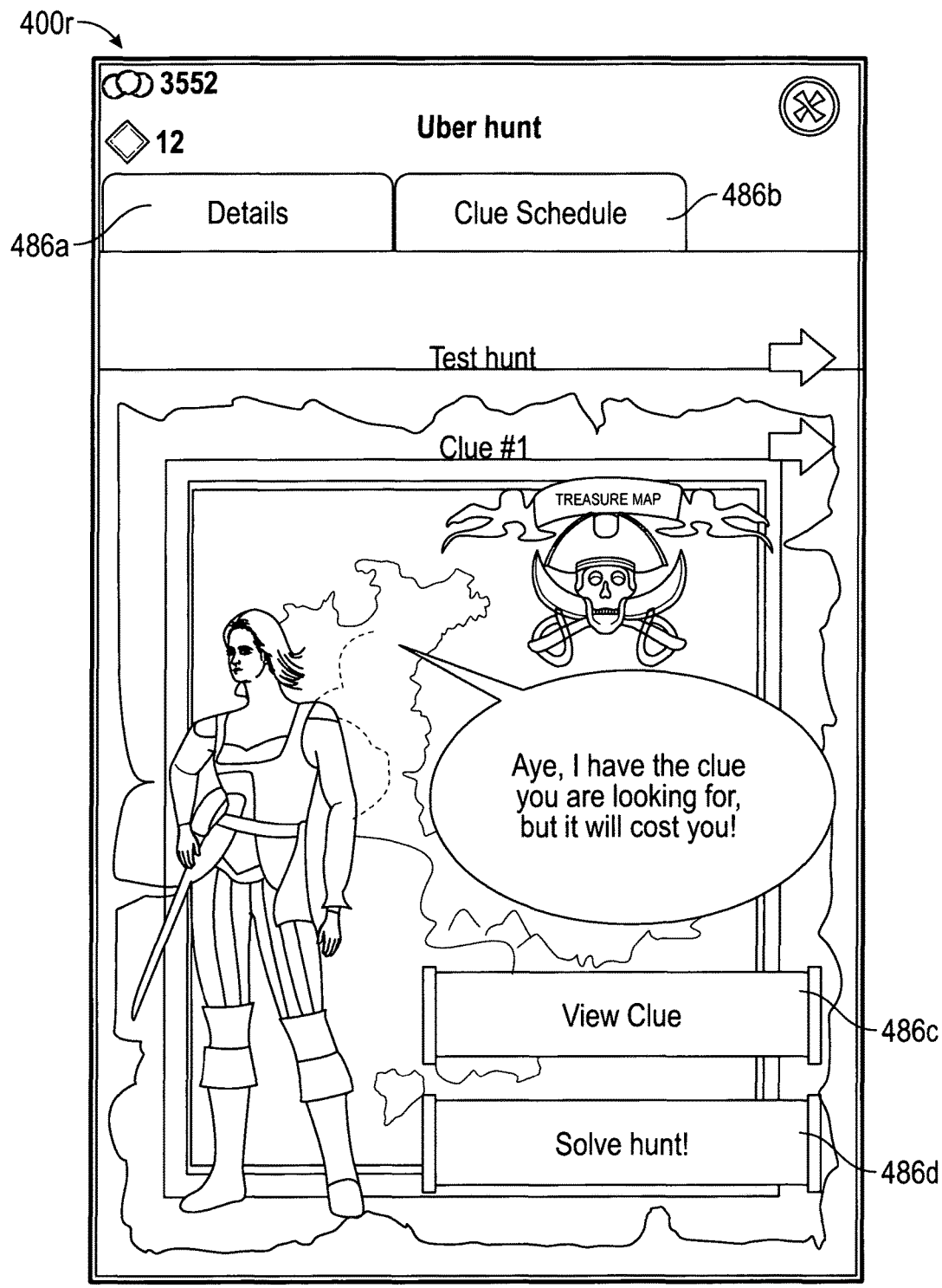
FIG. 4R-FIG. 4T are diagrams depicting example screens of clue screens, according to exemplary embodiments of the present disclosure.
Figure 4S:
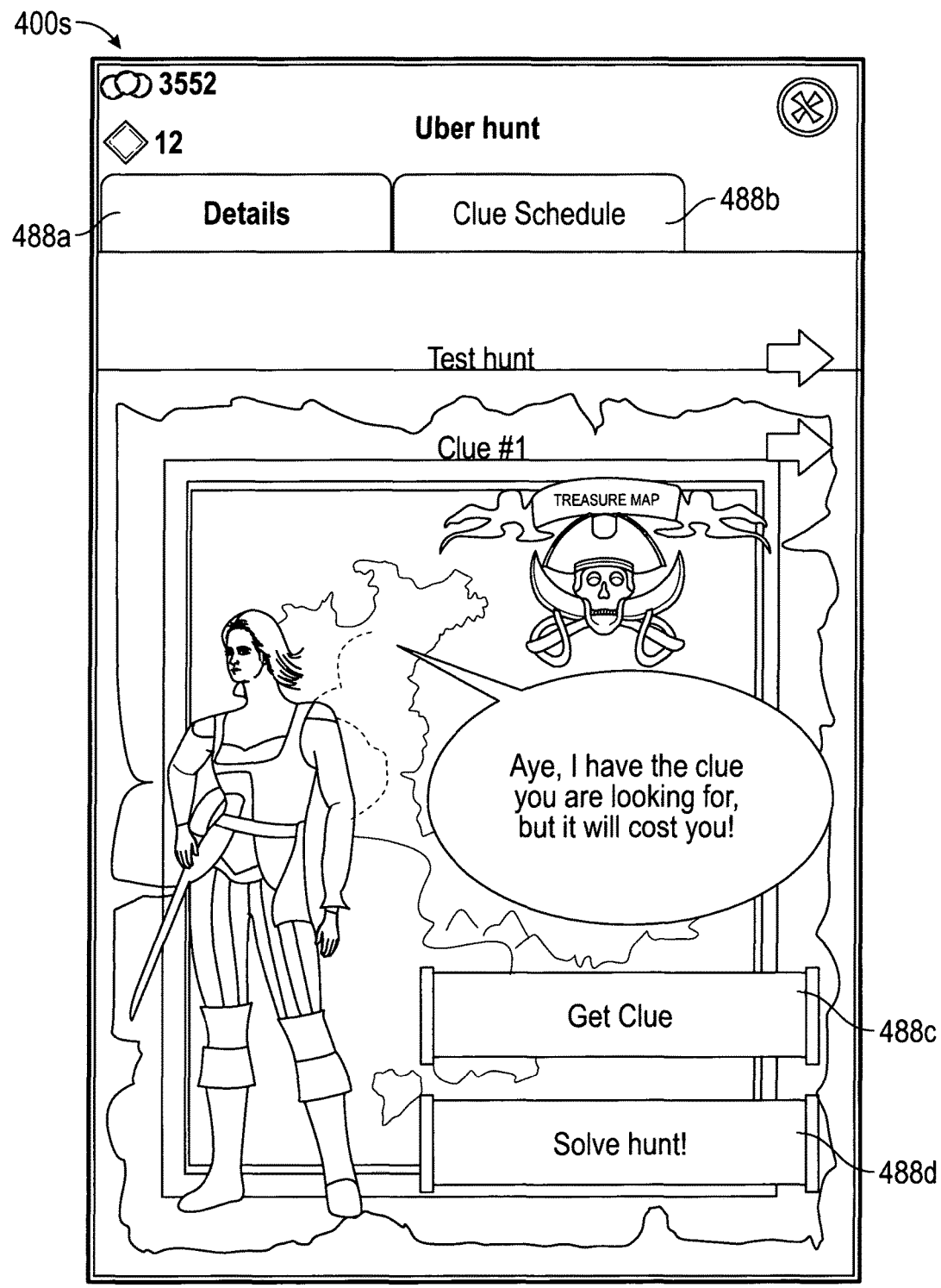
Figure 4T:
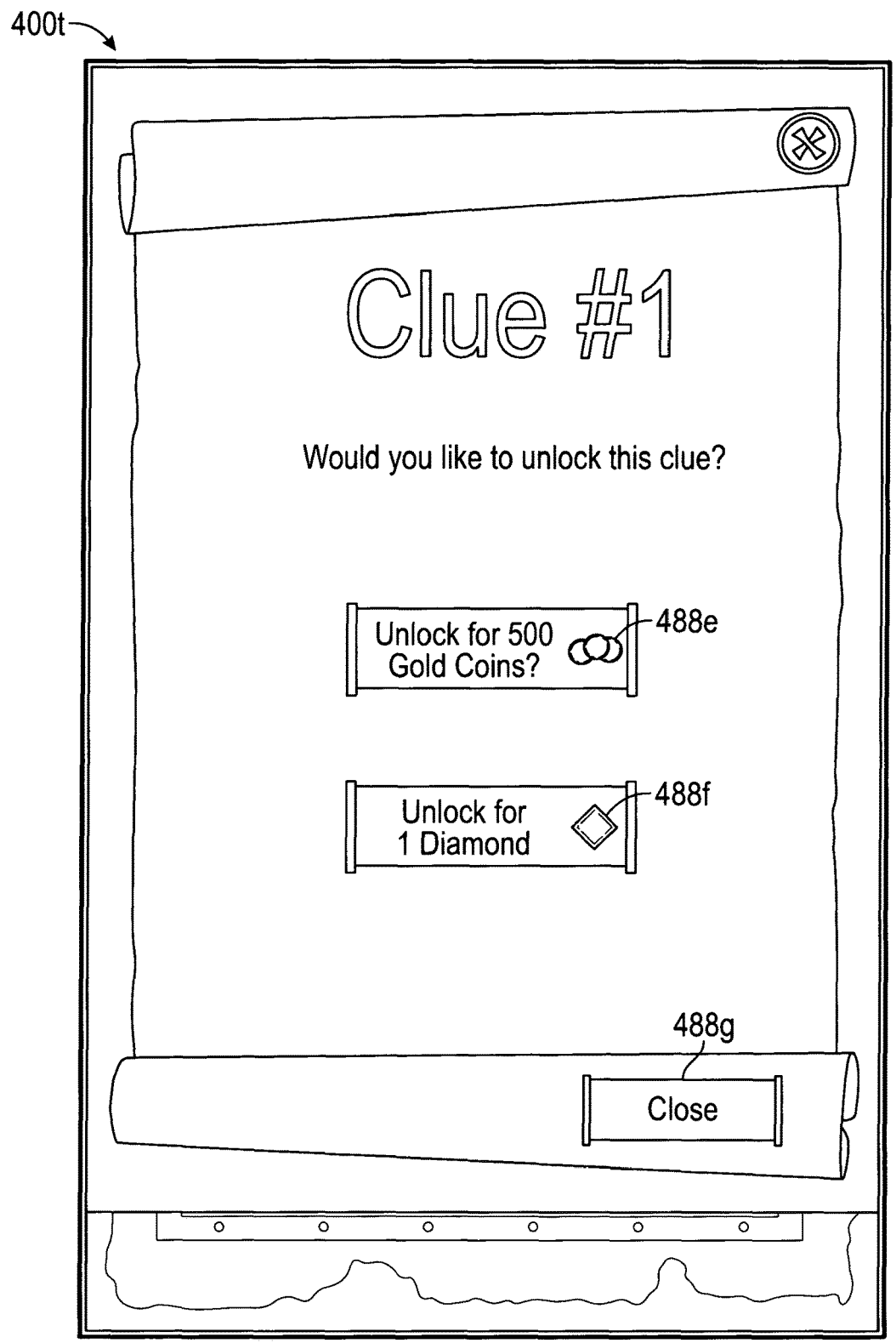

Referring to FIG. 4R-FIG. 4T are diagrams 400*r*-400*t* depicting example screens of clue screens, according to exemplary embodiments of the present disclosure. The user may get a chance to participate in the uber hunt by clicking on the collected currency appearing icon 416. The screen 400*r* depicts icons which are details icon 486*a*, clue schedule icon 486*b*, view clue icon 486*c*, and solve hunt icon 486*d*. The details icon 486*a* may provide details of the clues. The clue schedule icon 486*b* may be configured to give release schedule of the clues. If we clicked on the view clue icon 486*c*, it shows the clues. The clues may include but not limited to, the uber virtual object location images, texts, latitude information of the uber virtual object, longitude information of the uber virtual object, and the like. If the clues are locked or not yet released after clicking on the view clue icon 486*c*, then the screen 400*s* depicts the details icon 488*a*, clue schedule icon 488*b*, get clue icon 488*c* and the solve hunt icon 488*d*. If we clicked on the get clue icon 488*c*, the screen 400*t* depicts the number of rewards required to unlock the clues. The screen 400*t* includes a gold coins icon 488*e*, a diamonds icon 488*f* and close icon 488*g*. The gold coins icon 488*e* may be provided to know the number of gold coins is required to unlock the clues. The diamonds icon 488*f* may be provided to know the number of diamonds is required to unlock the clues. Once the clues successfully unlocked, click close icon 488*g* on the screen 400*t* to exit the dialog.

Figure 4U:
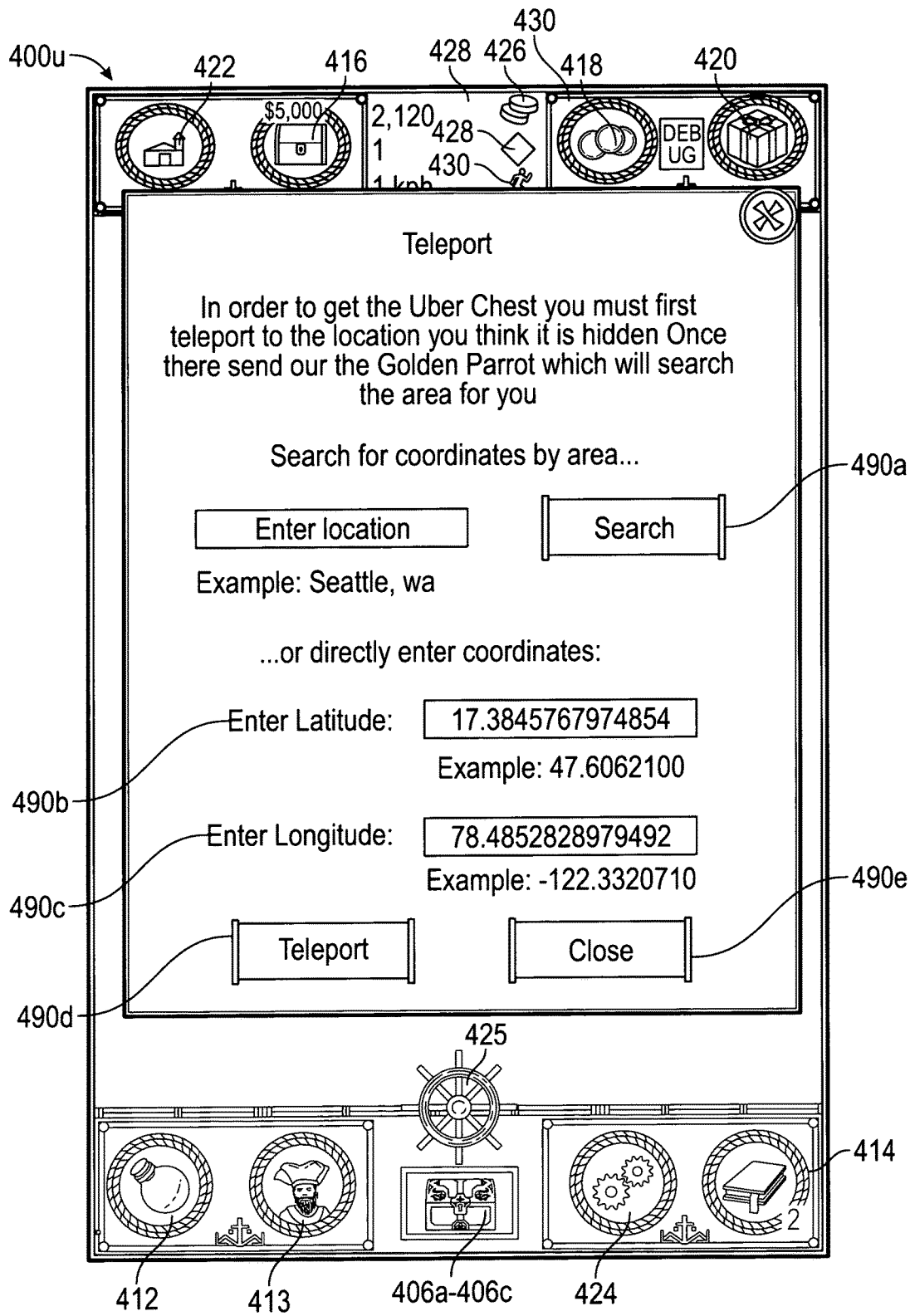
FIG. 4U-FIG. 4W are diagrams depicting example screens of teleport screens, according to exemplary embodiments of the present disclosure.
Figure 4V:
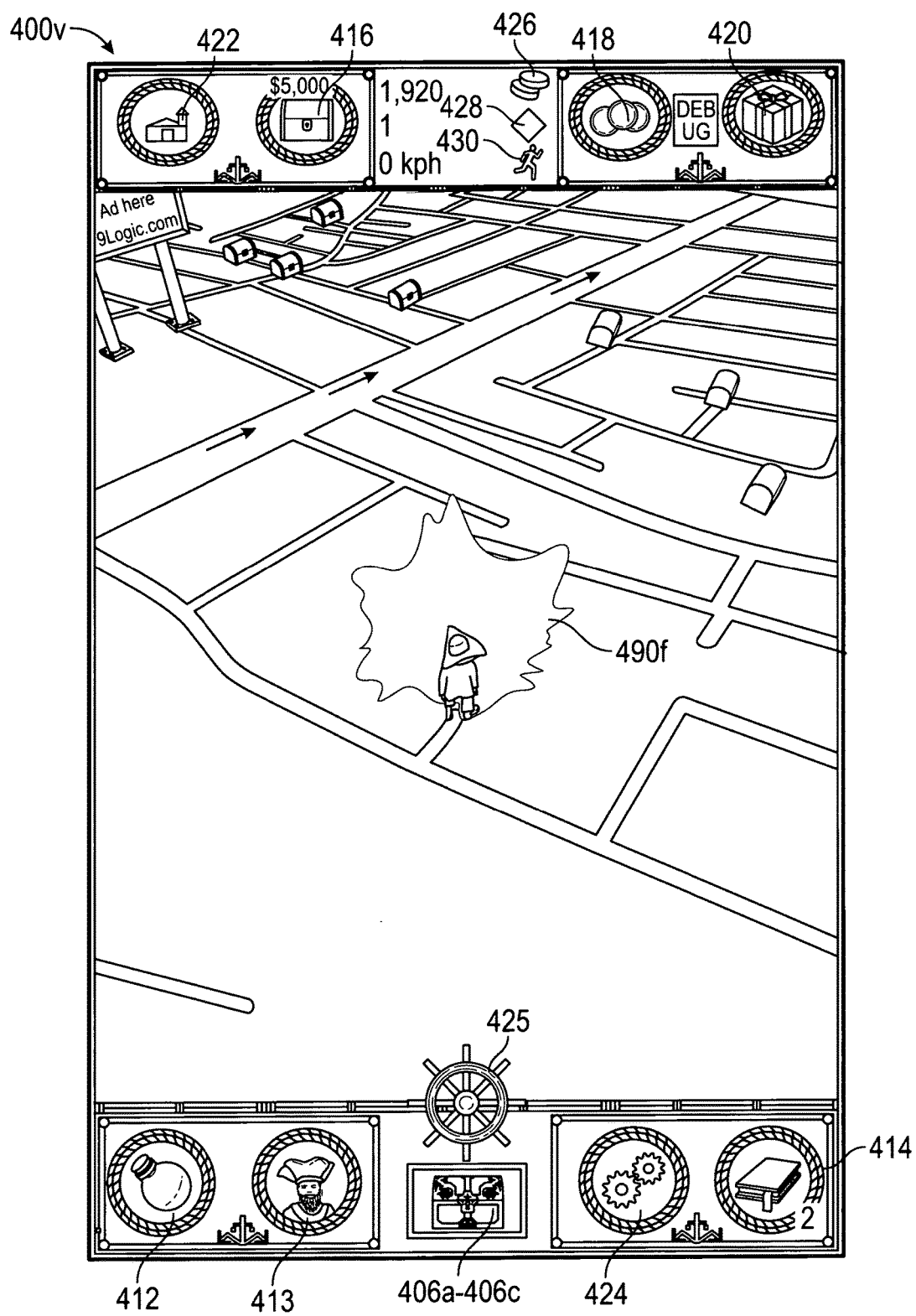
Figure 4W:
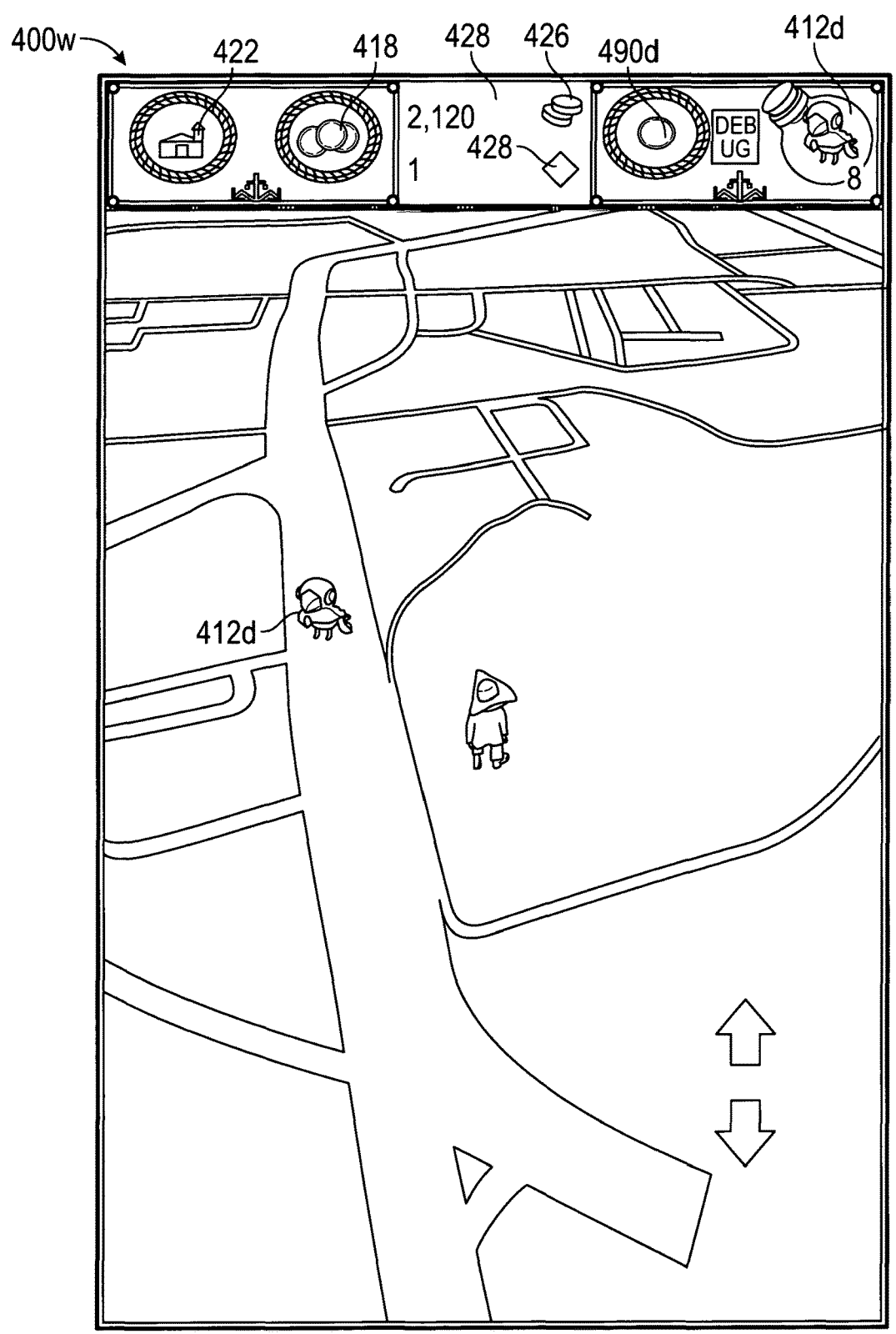

Referring to FIG. 4U-FIG. 4W are diagrams 400*u*-400*w* depicting example screens of teleport screens, according to exemplary embodiments of the present disclosure. The screen 400*u* depicts search icon 490*a*, latitude icon 490*b*, longitude icon 490*c*, teleport icon 490*d* and close icon 490*e*. The user may enter the name of the location, longitude, latitude information in the search icon 490*a*, the latitude icon 490*b*, and the longitude icon 490*c* for teleporting to the location. The screen 400*v* depicts the teleporting 490*f*.

The screen 400*w* depicts the home icon 422, the coins storage icon 418, teleport icon 490*d*, and the golden parrot icon 412*d*. The teleport icon 490*d* may be configured to teleport to locations. The user may use the golden parrot icon 412*d* in the location to search the uber virtual object for getting the higher level rewards. Messages may be shown to the user on success or failure of the uber hunt.

Figure 5:
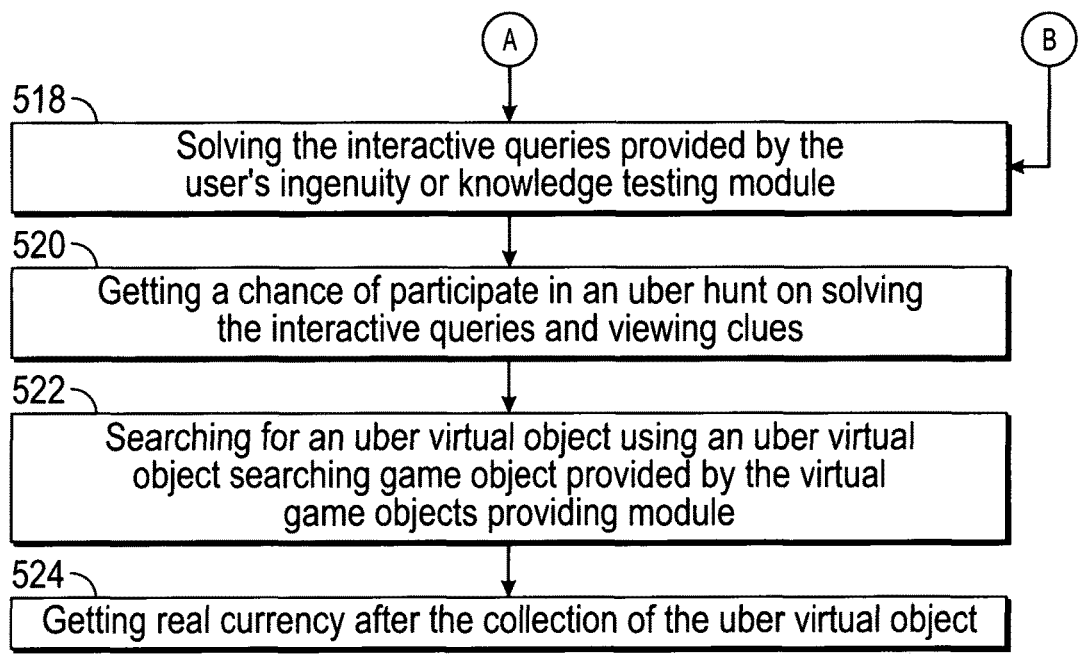
FIG. 5 is a flow diagram depicting a method for processing virtual objects in a computing environment, according to exemplary embodiments of the present disclosure.
Figure 5:
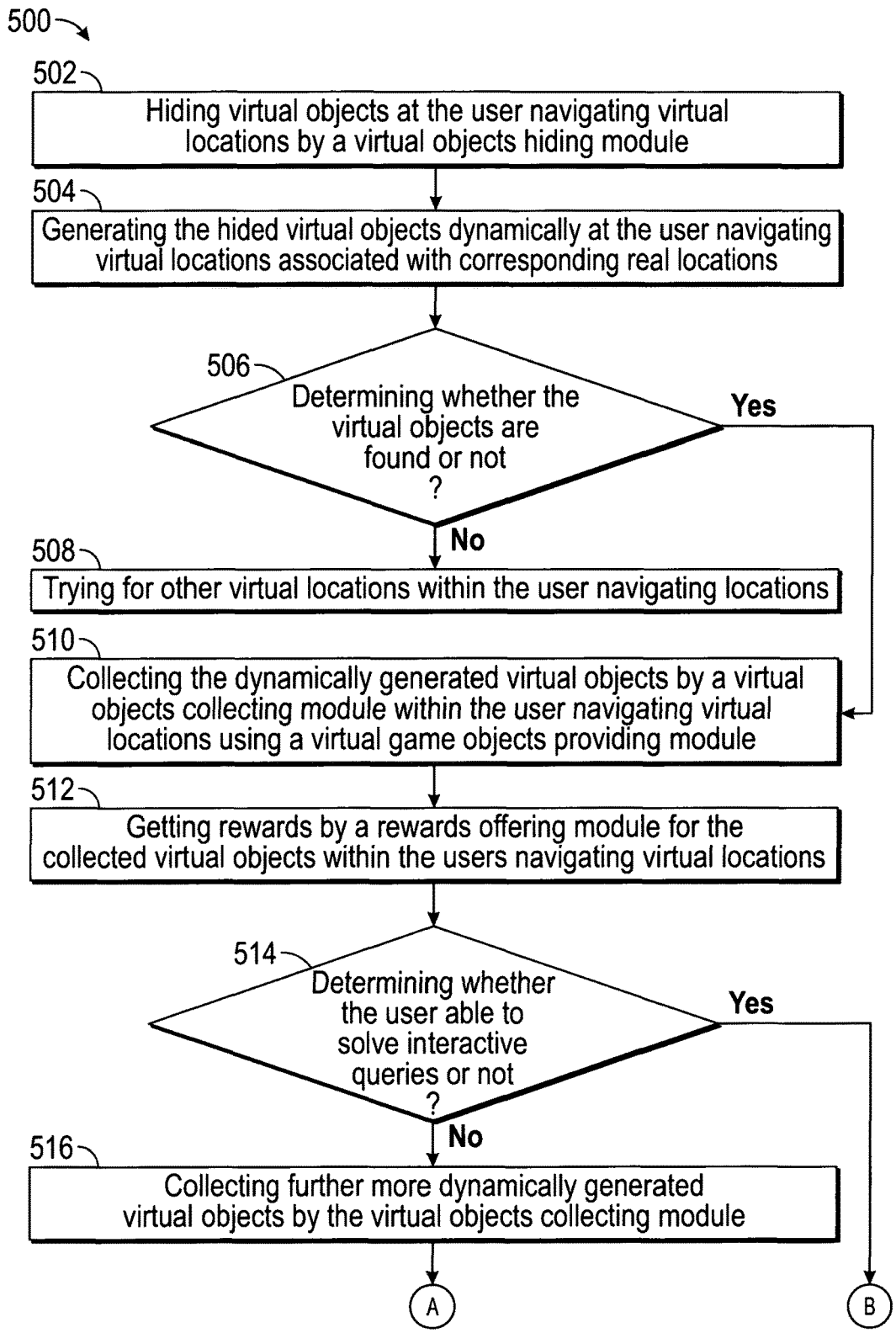

Referring to FIG. 5 is a flow diagram 500 depicting a method for processing virtual objects in a computing environment, according to exemplary embodiments of the present disclosure. As an option, the method 500 may be carried out in the context of the details of FIG. 1, FIG. 2, FIG. 3 and FIG. 4*a*-FIG. 4I. However, the method 500 may also be carried out in any desired environment. Further, the aforementioned definitions may equally apply to the description below.

The method commences at step 502, virtual objects may be hided at the user navigating virtual locations by a virtual objects hiding module. The hided virtual objects may be generated dynamically at user navigating virtual locations associated with corresponding real-time locations, at step 504. Validation is performed to determine whether the virtual objects are found or not at step 506. If the answer to the validation at step 506 is NO, then the method continues to next step 508, then the user may try for other virtual locations within the user navigating virtual locations for collecting dynamically generated virtual objects. If the answer to validation at step 506 is YES, then the method continues to next step 510 the dynamically generated virtual objects may be collected by a virtual objects collecting module within the user navigating virtual locations using a virtual game objects providing module. Here, the virtual game objects providing module may be configured to provide virtual game objects to the user for collecting the virtual objects.

The user may get rewards by a rewards offering module for the collection of virtual objects within the user's navigating virtual locations, at step 512. Validations is performed to determine whether the user able to solve interactive queries or not, at step 514. At step 514 is NO, then the user may try for further more dynamically generated virtual objects, at step 516. At step 514 is YES, wherein the user needs to solve the interactive queries provided by a user's ingenuity or knowledge testing module, at step 518. The user may get a chance of participate in an uber hunt on solving the interactive queries and viewing clues, at step 520. The user may use an uber virtual object searching game object provided by the virtual game objects providing module to search for an uber virtual object, at step 522. The user may get real currency after the collection of the uber virtual object, at step 524.

Figure 6:
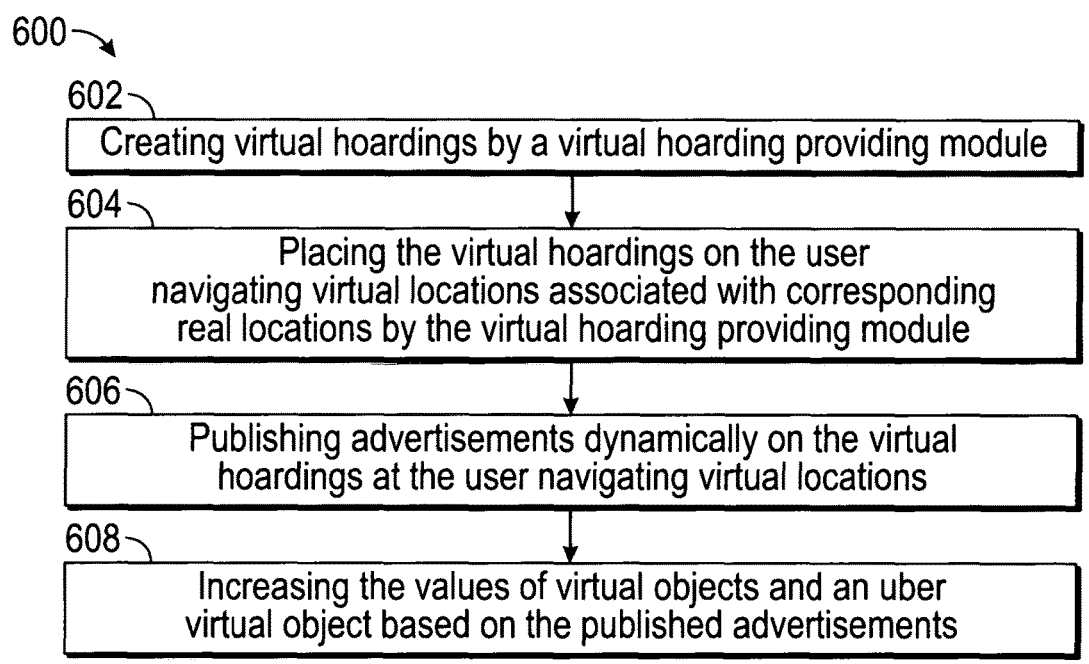
FIG. 6 is a flow diagram depicting a method for increasing value of virtual objects, according to exemplary embodiments of the present disclosure.

Referring to FIG. 6 is a flow diagram 600 depicting a method for increasing value of virtual objects, according to exemplary embodiments of the present disclosure. As an option, the method 600 may be carried out in the context of the details of FIG. 1, FIG. 2, FIG. 3, and FIG. 4*a*-FIG. 4I and FIG. 5. However, the method 600 may also be carried out in any desired environment. Further, the aforementioned definitions may equally apply to the description below.

The method commences at step 602, virtual hoardings may be created by a virtual hoardings providing module. The virtual hoardings may be placed on the user navigating virtual locations associated with corresponding real-time locations by the virtual hoarding providing module, at step 604. Here, the virtual hoardings may be positioned on the smaller location of virtual objects or uber virtual object at the user navigating virtual locations. The advertisements may be published dynamically on the virtual hoardings at the user navigating virtual locations, at step 606. The virtual objects and an uber virtual object value may be increased based on the published advertisements, at step 608. Here, the advertisements revenue may be given to the user in the form of rewards and the higher level rewards based on the collection of virtual objects.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions. It should also be noted that, in some alternative implementations, the functions noted in the block may occur in any order or out of the order noted in the figures.

Although the present disclosure has been described in terms of certain preferred embodiments and illustrations thereof, other embodiments and modifications to preferred embodiments may be possible that are within the principles and spirit of the invention. The above descriptions and figures are therefore to be regarded as illustrative and not restrictive.

Thus the scope of the present disclosure is defined by the appended claims and includes both combinations and sub combinations of the various features described herein above as well as variations and modifications thereof, which would occur to persons skilled in the art upon reading the foregoing description.

What is claimed is:

1. A gaming system comprising:
an input device;
a display device;
a processor; and
a memory device storing instructions, which when executed by the processor, cause the processor, in conjunction with the input device and the display device, to:
initiate and execute a game that includes at least a first portion of the game and an uber hunt of the game;
generate user navigating locations associated with real-time locations;
dynamically generate virtual objects;
hide the virtual objects at the user navigating locations associated with the real-time locations;
generate virtual game objects;
enable a user to collect, using the virtual game objects, the hidden virtual objects;
offer a plurality of virtual rewards to the user based on the collection of the virtual game objects;
initiate and execute the uber hunt in response to the selection of a displayed icon;
generate and display a plurality of interactive queries using the plurality of virtual rewards for participating in the uber hunt;
generate and display clues for solving the plurality of interactive queries based on the virtual rewards;
enable the user to solve the plurality of interactive queries;
generate an uber virtual object searching game object;
generate an uber virtual object located within the user navigating locations associated with the real-time locations;
enable the user to use the uber virtual object searching game object to search for and collect the uber virtual object located within the user navigating locations associated with the real-time locations;
in response to the user collecting the uber virtual object, provide a higher level reward;
generate and display a leader board that provides distances covered by the user, coins collected by the user, and prizes collected by the user;
multiply the virtual objects on the user navigating virtual locations;
lock the virtual objects on the user navigating virtual locations;
print user initials on the virtual objects, wherein other users are enabled to view the user initials;
prevent the user on the user navigating virtual locations from seeing objections;
apply a crystal balls applying object on the user navigating virtual locations to enable the user to see any virtual objects with a radius of the user navigating virtual locations of a current position of the user;
apply a parrot object configured to fetch at least one of the virtual objects which is distant from the user, and bring the fetched at least one virtual object to a location of the user;
generate virtual hoardings;
publish advertisements on the virtual hoardings at the user navigating virtual locations; and
increase values of the virtual objects and the uber virtual object based on the published advertisements.

* * * * *